United States Patent
Ghose et al.

(10) Patent No.: US 11,400,924 B2
(45) Date of Patent: *Aug. 2, 2022

(54) AUTONOMOUS VEHICLE MANEUVERING BASED UPON RISK ASSOCIATED WITH OCCLUDED REGIONS

(71) Applicant: GM Cruise Holdings LLC, San Francisco, CA (US)

(72) Inventors: Shiva Ghose, Berkeley, CA (US); Daniel Chen, San Francisco, CA (US); Ted Nitz, Hayward, CA (US); Christophe Philippona, San Francisco, CA (US); Curt Harrington, San Francisco, CA (US); Christopher Daily-Diamond, Oakland, CA (US); Mason Swofford, Fishers, IN (US); Ryan Holben, San Francisco, CA (US); Eric Lujan, San Francisco, CA (US); Benjamin Greer, San Francisco, CA (US); Francesco Capodieci, Daly City, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 357 days.

This patent is subject to a terminal disclaimer.

(21) Appl. No.: 16/371,083

(22) Filed: Mar. 31, 2019

(65) Prior Publication Data

US 2020/0307567 A1    Oct. 1, 2020

Related U.S. Application Data

(63) Continuation of application No. 16/371,012, filed on Mar. 31, 2019.

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *G05D 1/0088* (2013.01);
(Continued)

(58) Field of Classification Search
None
See application file for complete search history.

(56) References Cited

U.S. PATENT DOCUMENTS 9,254,846 B2    2/2016    Dolgov et al.
9,381,916 B1    7/2016    Zhu et al.
(Continued)

FOREIGN PATENT DOCUMENTS

DE    102015205930 A1    10/2016

OTHER PUBLICATIONS

"International Search Report for PCT Patent Application No. PCT/US2019/068683", dated Mar. 23, 2020, 6 Pages.
(Continued)

*Primary Examiner* — Russell Frejd
*Assistant Examiner* — Ana D Thomas
(74) *Attorney, Agent, or Firm* — Calfee, Halter & Griswold LLP

(57) ABSTRACT

An autonomous vehicle (AV) is described herein. The AV is configured to identify an occluded region where a portion of a field of view of a sensor is occluded by an object. The AV is further configured to hypothesize that an object exists in the occluded region and is moving in the occluded region. The AV is still further configured to perform a driving maneuver based upon the hypothesized object existing in the occluded region.

19 Claims, 17 Drawing Sheets

(51) Int. Cl.
*G05D 1/00* (2006.01)
*G08G 1/16* (2006.01)
*G05D 1/02* (2020.01)

(52) U.S. Cl.
CPC ........... *G05D 1/0214* (2013.01); *G08G 1/167* (2013.01); *G05D 2201/0213* (2013.01)

(56) References Cited

U.S. PATENT DOCUMENTS

| | | |
|---|---|---|
| 9,493,157 B2 | 11/2016 | Prokhorov |
| 9,811,091 B2 | 11/2017 | Dolgov et al. |
| 9,947,228 B1 | 4/2018 | Kim et al. |
| 10,146,223 B1 | 12/2018 | Luders et al. |
| 2016/0327953 A1 | 11/2016 | Nilsson et al. |
| 2017/0371338 A1 | 12/2017 | Kamata et al. |
| 2018/0259968 A1* | 9/2018 | Frazzoli ............... G05D 1/0219 |
| 2019/0250626 A1* | 8/2019 | Ghafarianzadeh ..... G06N 20/00 |
| 2019/0384302 A1 | 12/2019 | Silva et al. |
| 2020/0278681 A1 | 9/2020 | Gier et al. |

OTHER PUBLICATIONS

"Written Opinion of the International Searching Authority for PCT Patent Application No. PCT/US2019/068683", dated Mar. 23, 2020, 8 Pages.
"Non-Final Office Action for U.S. Appl. No. 16/371,012", dated Jan. 13, 2021, 36 Pages.
"Non-Final Office Action for U.S. Appl. No. 16/371,088", dated Mar. 23, 2021, 38 Pages.
"Non-Final Office Action for U.S. Appl. No. 16/371,012", dated Jul. 23, 2021, 14 Pages.
"Final Office Action for U.S. Appl. No. 16/371,012", dated Dec. 24, 2021, 13 pages.
"Response to the Final Office Action for U.S. Appl. No. 16/371,012", dated Feb. 22, 2022, 9 pages.

* cited by examiner

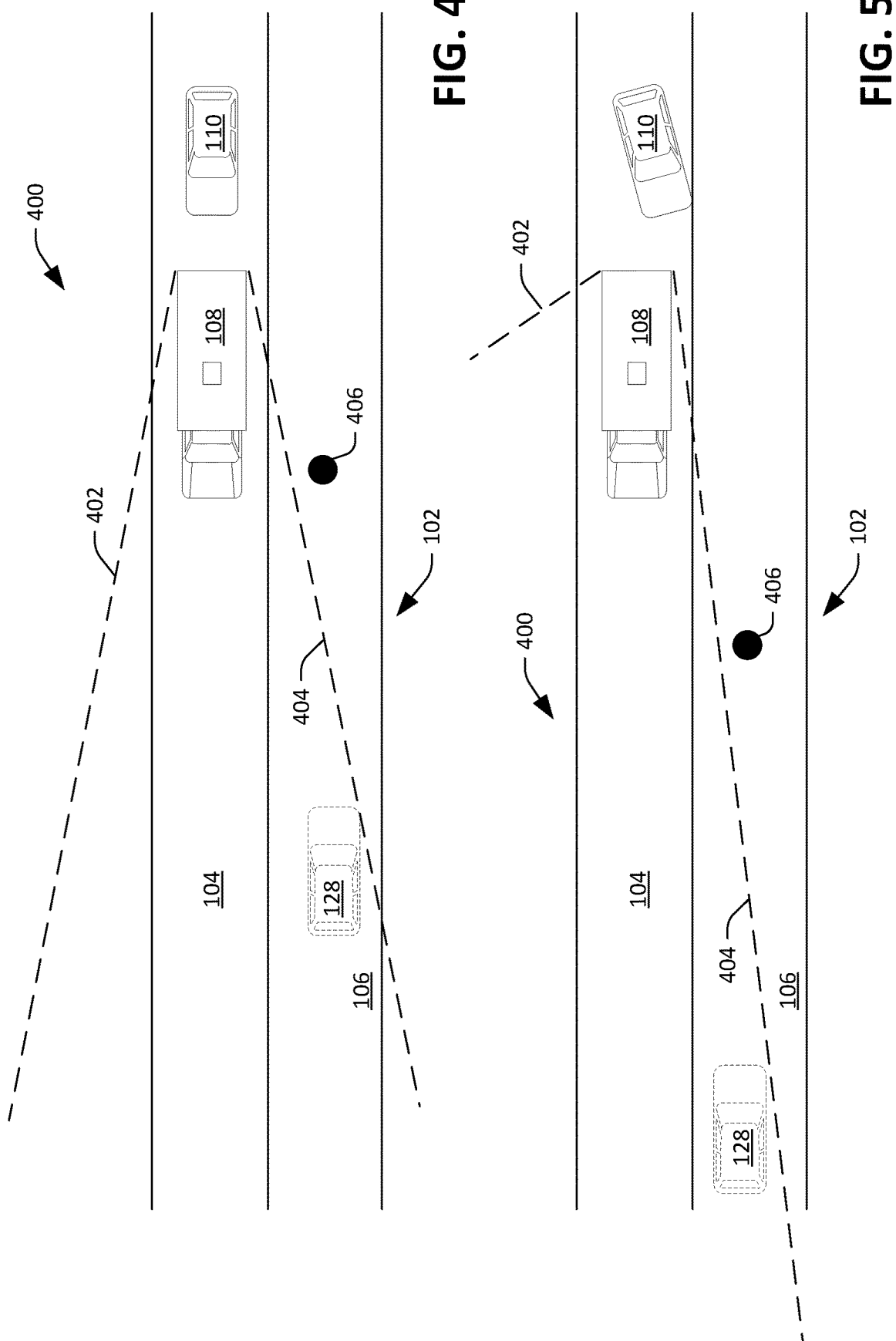

AUTONOMOUS VEHICLE MANEUVERING BASED UPON RISK ASSOCIATED WITH OCCLUDED REGIONS

RELATED APPLICATION

This application is a continuation of U.S. patent application Ser. No. 16/371,012, filed on Mar. 31, 2019, and entitled "AUTONOMOUS VEHICLE MANEUVERING BASED UPON RISK ASSOCIATED WITH OCCLUDED REGIONS". The entirety of this application is incorporated herein by reference.

BACKGROUND

An autonomous vehicle (AV) is a vehicle that is configured to navigate roadways based upon sensor signals output by sensors of the AV, wherein the AV navigates the roadways without input from a human. The AV is configured to identify and track objects (such as vehicles, pedestrians, bicyclists, static objects, and so forth) based upon the sensor signals output by the sensors of the AV and perform driving maneuvers (such as accelerating, decelerating, turning, stopping, etc.) based upon the identified and tracked objects.

There are scenarios, however, where the AV has no or limited visibility with respect to a spatial region (e.g., due to objects occluding one or more sensor signals, due to road geometries, due to inherent sensor limits, etc.). A spatial region where the AV has no or limited visibility is referred to herein as an occluded region. There is uncertainty associated with this occluded region, as the AV may be unable to ascertain whether there is an object in the occluded region, whether the object is moving in the occluded region, and so forth.

In a specific example, the AV may be traveling along a lane of a roadway and may encounter a truck that is stopped in the middle of the lane of the roadway (e.g., the truck may be double-parked, the truck may be disabled, etc.). As the AV moves closer to the back of the truck, a portion of a field of view of a sensor of the AV is occluded by the truck, resulting in an occluded region (from the perspective of the AV) that covers at least a portion of an adjacent lane of the roadway (where the adjacent lane includes oncoming traffic). Conventionally, as the AV lacks visibility into the occluded region, the AV fails to act. Instead, the AV remains "stuck" behind the truck until the truck moves or until a human takes control of the AV.

SUMMARY

The following is a brief summary of subject matter that is described in greater detail herein. This summary is not intended to be limiting as to the scope of the claims.

Described herein are various technologies pertaining to an autonomous vehicle (AV) that is configured to identify an occluded region based upon a sensor signal output by a sensor of the AV and is further configured to select and perform a driving maneuver based upon an assessment of risk that corresponds to the occluded region. With more specificity, the AV: 1) defines the occluded region by identifying a spatial region where the AV lacks visibility; 2) hypothesizes that a vehicle (or other object such as a bicyclist or pedestrian) exists in the occluded region (e.g., at or proximate a boundary of the occluded region that is closest to the AV); 3) estimates a velocity of the hypothesized vehicle; 4) estimates a reaction of the hypothesized vehicle to the AV; and 5) identifies and performs a driving maneuver based upon the boundary of the occluded region, the estimated velocity of the hypothesized vehicle, and the estimated reaction of the hypothesized vehicle to the AV.

In a specific example, the AV is traveling in a first lane of a two-lane roadway, where traffic in a second lane of the two-lane roadway flows in a direction that is opposite the flow of traffic in the first lane. The AV, when travelling along a route, comes upon a truck that is stopped in the first lane of the roadway. The AV identifies the truck and further identifies an occluded region based upon the truck being identified and a location of the truck relative to the location of the AV. The occluded region (e.g., the spatial region where the AV is "blind" due to the existence of the truck) encompasses a portion of the second lane. To reach its intended destination, the AV needs to continue travelling along the roadway and thus must exit the first lane and enter the second lane (of oncoming traffic) in order to pass the truck.

The AV, in connection with assessing risk as to whether to exit the first lane and enter the second lane, identifies boundaries of the occluded region and further determines that the occluded region includes at least a portion of the second lane. The AV hypothesizes that a vehicle is traveling in the second lane in the occluded region at some estimated velocity. For instance, the AV can infer that the hypothesized vehicle is just beyond the boundary of the occluded region (i.e., the vehicle is barely occluded by the truck from the perspective of the AV) and is traveling at some constant velocity in the second lane. The AV can then infer a reaction of the hypothesized vehicle to the AV.

More specifically, the AV can infer that the hypothesized vehicle is at a position in the occluded region where the AV will be first observable to the vehicle. The AV can compute this position based upon a current position of the AV, a physical profile of the AV, a boundary of the occluded region, and an estimated position of a driver of the hypothesized vehicle (such that a line of sight exists for the driver to a portion of the AV). The AV can then estimate an amount of time required for the hypothesized vehicle to react to the AV upon observing the AV (e.g., the AV can estimate the reaction time of a driver of the hypothesized vehicle). In addition, the AV can estimate a deceleration of the hypothesized vehicle once the hypothesized vehicle reacts to the AV. Hence, the AV can infer that at time to (the current time) the AV will be first observable to the hypothesized vehicle, wherein the hypothesized vehicle is assumed to be at the computed position. The AV can additionally infer that at time ti the hypothesized vehicle will react and begin to slow down upon observing the AV (at some reasonable deceleration).

Based upon these inferences, the AV can select and perform a driving maneuver. The selected driving maneuver may include accelerating from behind the truck and entering the second lane of traffic (e.g., due to the AV estimating that the AV and the hypothesized vehicle will be able to stop before a collision can occur). In another example, the driving maneuver may include moving to alter the boundary of the occluded region (to provide the AV with a better view of the second lane of the roadway). In yet another example, the driving maneuver may include crossing over the lane of oncoming traffic to perform a turn across a lane of oncoming traffic. When the sensor of the AV outputs a sensor signal that indicates existence of an object in a field of view of the sensor, the AV can operate based upon the identified object.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 4-6 are schematics that illustrate exemplary operation of an AV upon the AV identifying an occluded region.

DETAILED DESCRIPTION

Figure 1:
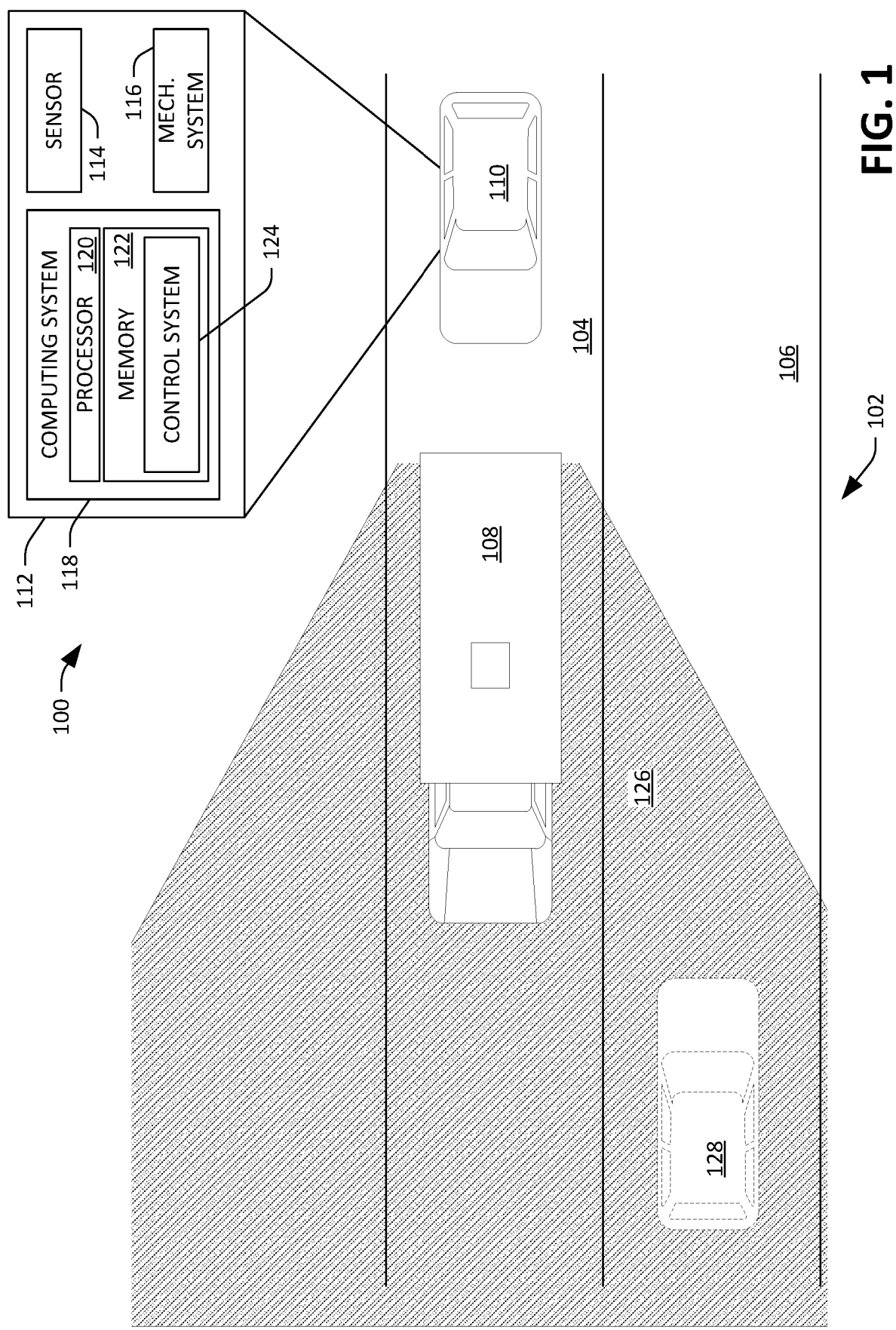
FIG. 1 is a schematic that illustrates an autonomous vehicle (AV) performing a driving maneuver based upon an assessment of risk of existence of a vehicle in a spatial region that is occluded from the perspective of a sensor of the AV.

Various technologies pertaining to an autonomous vehicle (AV) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices. Further, as used herein, the term "exemplary" is intended to mean "serving as an illustration or example of something."

Described herein are various technologies pertaining to an AV that is able to maneuver when the AV lacks optimal visibility while ensuring that regions of interest (portions of roadway that are to be traveled over by the AV) are clear of road users with which the AV could potentially interact. While the AV is navigating roadways, the AV is configured to ensure sufficient spatial and temporal buffers between the AV and other road users to avoid unsafe situations. These buffers can be readily enforced when the AV is able to perceive every road user. Enforcing such buffers, however, is difficult when the AV lacks visibility of portions of the environment surrounding the AV. This lack of visibility can be caused by a variety of reasons, such as: 1) objects in the world, such as other road users; urban infrastructure that occlude regions of interest, etc.; 2) road geometry (such as a road curving); 3) environmental factors (e.g., fog, rain, etc.) that can reduce the efficacy of sensors; 4) a sensor failing; 5) inherent sensor limitations (e.g., sensing distance); and so forth.

An AV is described herein that is able to model uncertainty associated with spatial regions where the AV lacks visibility. The AV is further able to assess risk with respect to maneuvering in such spatial regions, and the AV operates based upon this assessment of risk. Accordingly, the AV is able to safely maneuver even when it is unable to "see" all of its surrounding environment.

With reference now to FIG. 1, a schematic that depicts an operating environment 100 of an AV is illustrated. The operating environment 100 comprises a roadway 102 that includes a first lane 104 and a second lane 106, wherein traffic in the first lane 104 and traffic in the second lane 106 flow in opposite directions. Further, in the exemplary environment 100, the first lane 104 is immediately adjacent the second lane 106.

In the illustrated environment 100, a truck 108 is stopped in the first lane 104 and an AV 110 travelling in the first lane 104 has come behind the truck 108 in the first lane 104. To reach its intended destination, the AV 110 is to continue along the roadway 102 along its current direction of travel. To do so, the AV 110 must either wait for the truck 108 to resume moving in the first lane 104 or must navigate around the truck 108. To navigate around the truck 108, the AV 110 must exit the first lane 104, enter the second lane 106, and travel in the second lane 106 against the flow of traffic of the second lane 106. The AV 110 can employ technologies described herein to safely navigate around the truck 108.

Componentry of the AV 110 is illustrated in callout 112. The AV 110 comprises a sensor 114, a mechanical system 116, and a computing system 118. While the AV 110 is illustrated as including the sensor 114 and the single mechanical system 116, it is to be understood that the AV 110 may include multiple sensors and multiple mechanical systems. For instance, the AV 110 can include a vision sensor (e.g., a video camera), a lidar sensor, a radar sensor, a sonar sensor, a global positioning system (GPS), and so forth. Similarly, mechanical systems that can be included in the AV 110 comprise propulsion system (a combustion engine, an electric motor, a hybrid system, etc.), a braking system, a steering system, and so forth. The computing system 118 is operably coupled to the sensor 114 and the mechanical system 116. The computing system 118 includes a processor 120 and memory 122, wherein a control system 124 is loaded in the memory 122. The control system 124 is configured to control operation of the mechanical system 116 based upon sensor signals output by the sensor 114.

Due to the position of the truck 108 in the first lane 104 relative to the position of the AV 110, the AV 110 lacks visibility with respect to certain portions of the environment 100. For example, as the AV 110 approaches the back of the truck 108, a portion of a field of view of the sensor 114 is occluded by the truck 108 (e.g., the sensor 114 is unable to "see" around the truck 108). Thus, there is an occluded region 126 from the perspective of the AV 110. The occluded region 126 is a spatial region where the AV 110 has little or no visibility—e.g., the AV 110 is unable to determine with 100% certainty as to whether there is a road user in the occluded region 126, whether a road user is moving in the occluded region 126, etc. The occluded region 126 includes a portion of the second lane 106 of the roadway, and thus it is possible that a vehicle is traveling in the second lane 106 of the roadway but cannot be identified by the AV 110 due to the vehicle being in the occluded region 126. As will be described below, the control system 124 is configured to assess risk of the AV 110 if the AV 110 were to exit the first lane 104 and enter the second lane 106 to navigate around an object (the truck 108) that has occluded the field of view of the sensor 114.

Figure 2:
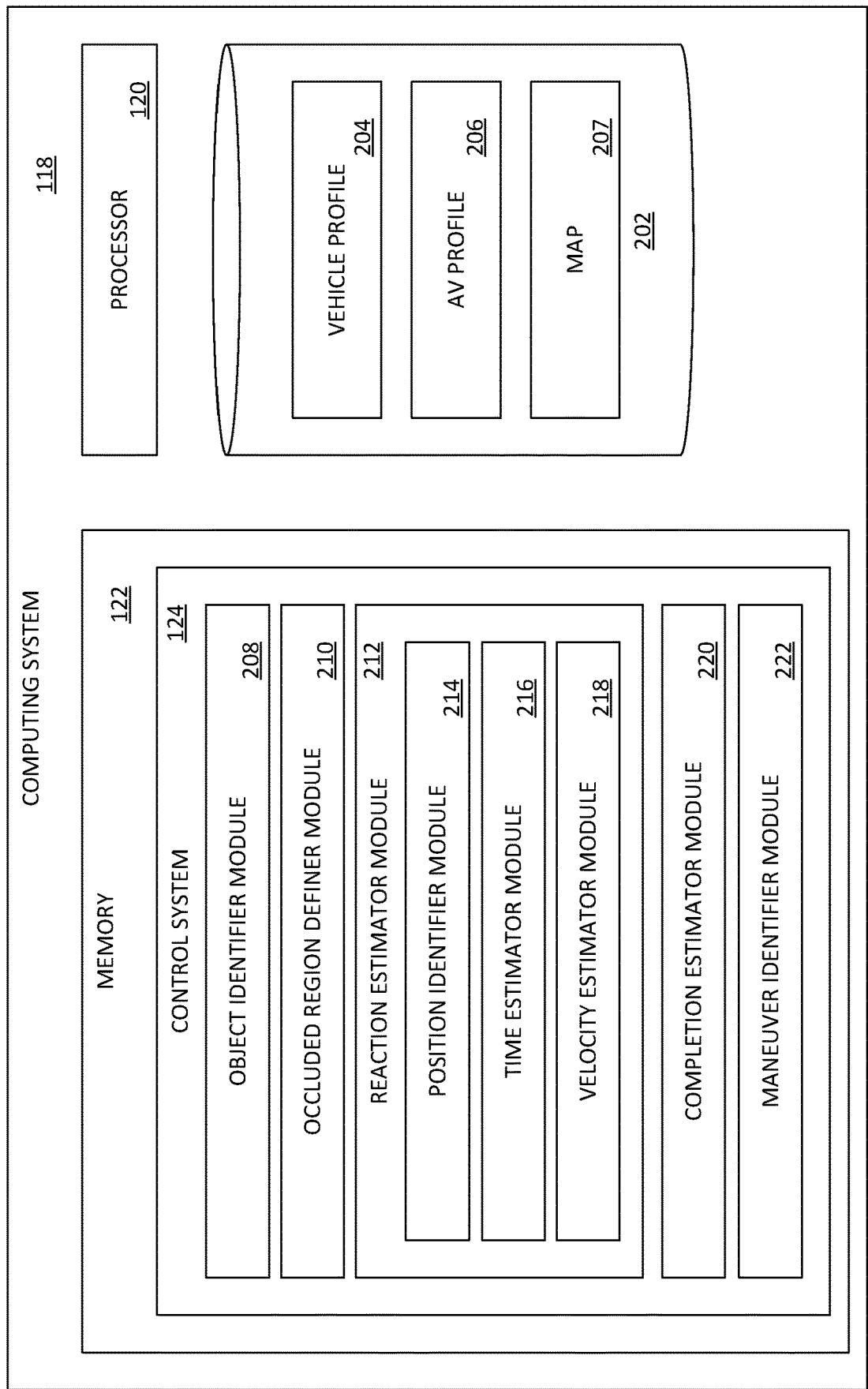
FIG. 2 is a functional block diagram of an exemplary computing system that is included in the AV.

With reference now to FIG. 2, a functional block diagram of the computing system 118 is illustrated. The computing system 118 includes the processor 120 and the memory 122. The computing system 118 additionally comprises a data store 202, wherein the data store 202 can include a vehicle profile 204, an AV profile 206, and a map 207 of an environment in which the AV 110 operates. The vehicle profile 204 comprises a model of a vehicle that travels over roadways, and accordingly the vehicle profile 204 can include data such as maximum velocity, maximum acceleration, an acceleration curve (e.g., potential accelerations and decelerations of the vehicle when the vehicle is travelling at different speeds), a physical profile of the vehicle, and so forth. The AV profile 206 can comprise a model of the AV 110, and accordingly can include a physical profile of the AV 110 (length and width of the AV 110, location of the sensor 118 on the AV 110, etc.), maximum acceleration of the AV 110, maximum velocity of the AV 110, an acceleration curve for the AV 110, turning radius of the AV 110, etc. The map 207 is a detailed map of the environment in which the AV 110 operates, and can include locations of lane boundaries, locations of traffic signs and signals, locations of manholes, speed limits for roadways, etc.

The control system 124, as noted above, is configured to control the mechanical system 116 of the AV 110 based upon a sensor signal output by the sensor 114. To that end, the control system 124 includes an object identifier module 208 that is configured to identify an object in a field of view of the sensor 114 based upon the sensor signal output by the sensor 114. In addition, the object identifier module 208 can be configured to track identified objects over time. Exemplary objects that can be identified by the object identifier module 208 include, for example, a truck, a car, a bicyclist, a pedestrian, vegetation, static objects (such as construction barrels), and so forth.

The control system 124 also includes an occluded region definer module 210 that is configured to define an occluded region based upon output of the sensor 114 of the AV 110 (and other sensors of the AV 110). For example, the computing system 118 can receive sensor signals output by sensors of the AV 110, and can create a three-dimensional model of the environment of the AV 110 based upon the sensor signals and the map 207. The occluded region definer module 210 can identify portions of the model where there is a lack of data from the sensor signals; the occluded region definer module can define a spatial region in the environment of the AV 110 that corresponds to a portion of the model where there is a lack of data from the sensor signals is an occluded region.

The control system 124 further includes a reaction estimator module 212 that is configured to estimate a reaction of a vehicle (in the occluded region 126) to the AV 110 if the vehicle were traveling in the occluded region 126 towards the AV 110. Returning to FIG. 1, the reaction estimator module 212 can hypothesize that a vehicle 128 is traveling in the second lane 106 of the roadway 102 in a direction that is opposite the direction of travel of the AV 110. Specifically, the reaction estimator module 212 can hypothesize that the vehicle 128 is at a "worst-case" position in the occluded region 126, where the AV 110 is barely observable to the vehicle 128 but the vehicle 128 is included in the occluded region 126 and thus is not captured in the sensor signal output by the sensor 114. The reaction estimator module 212 can further assign a velocity to the vehicle 128 when the vehicle 128 is at the hypothesized position. Further, the reaction estimator module 212 can compute a reaction of the vehicle 128 to the AV 110. For example, the reaction estimator module 212 can infer that the vehicle 128 will continue to travel at a constant velocity for some period of time after the AV 110 is observable to the vehicle 128, and will then begin to decelerate (at some reasonable deceleration rate) in order to avoid a potential collision with the AV 110. The reaction estimator module 212 can estimate that the vehicle 128 will begin to decelerate (until the vehicle 128 comes to a stop) to avoid a collision with the AV 110.

Returning to FIG. 2, the reaction estimator module 212 includes a position identifier module 214 that computes a position in the occluded region 126 where the vehicle 128 is expected to first observe the AV 110. The position estimator module 214 can compute this position based upon a line of sight between an estimated position of a driver of the vehicle 128, the physical profile of the AV 110 (as defined in the AV profile 206), and the occluded region identified by the occluded region definer module 210. Thus, the position estimator module 214 can compute that the vehicle 128 is just inside the occluded region 126 at a position where a portion of the AV 110 would be viewable to the vehicle 128 but where the AV 110 lacks visibility.

The reaction estimator module 212 can additionally include a time estimator module 216 that estimates a reaction time for the vehicle 128 with respect to the AV 110, wherein the reaction time is an amount of time between when the vehicle 128 first observes the AV 110 and when the vehicle 128 undertakes a driving maneuver (e.g., when the driver of the vehicle 128 begins to brake) in response to observing the AV 110.

The reaction estimator module 212 additionally comprises a velocity estimator module 218 that is configured to estimate a velocity of the vehicle 128 when the vehicle is at the position computed by the position identifier module 214. The velocity estimator module 218 can estimate the velocity of the vehicle 128 based upon, for example, a speed limit of the second lane 106 of the roadway 102, time of day, day of the week, width of the second lane 106 (vehicles tend to drive slower in confined spaces), velocities of other vehicles on the roadway 102 as observed by the AV 110, crowd-sourced data about traffic, locations of traffic signals or signs (stoplights, stop signs, yield signs, etc.) on the roadway 102, geometry of the roadway 102, etc. Thus, the reaction estimator module 212 can infer how the vehicle 128 will act based upon the position of the vehicle 128 output by the position identifier module 214, the velocity of the vehicle 128 output by the velocity estimator module 218, and the time output by the time estimator module 216. In addition, the reaction estimator module 212 can infer how the vehicle 128 will act based upon a type of maneuver that is to be performed by the AV 110.

For example, when the AV 110 is to enter the second lane 106 of the roadway and potentially travel in the direction of oncoming traffic, the reaction estimator module 212 can infer that the vehicle 128 will attempt to come to a complete stop in the second lane 106 upon observing the AV 110. Accordingly, the reaction estimator module 212 can compute an interaction point, wherein the interaction point is a position in the second lane 106 where the vehicle 128 is expected to cease moving upon observing the AV 110. The reaction estimator module 212 can compute the interaction point based upon: 1) the position of the vehicle 128 identified by the position identifier module 214; 2) the velocity of the vehicle 128 at the position output by the velocity estimator module 218; 3) the reaction time output by the time estimator module 216; and 4) estimated deceleration for the vehicle 128. Specifically, the reaction estimator module 212 can infer that the vehicle 128, when at the position computed by the position identifier module 208, is travelling at the velocity output by the velocity estimator module 218 in the second lane 106 towards the AV 110. The reaction estimator module 212 can further infer that the vehicle 128 will continue to travel at the velocity for the amount of time output by the time estimator module 216, and hence the reaction estimator module 212 can compute a second position for the vehicle 128 where the vehicle is expected to begin slowing down. Based upon this second position, the estimated velocity, and an estimated deceleration, the reaction estimator module 212 can compute the interaction point for the vehicle 128.

In a specific example, the reaction estimator module 212 can compute the interaction point for the vehicle 128 through use of the following algorithm:

$$s_{interact} = v_i \times (\tau + t_{visible}) + \frac{v_i^2}{(2 \times a_{decel})}, \quad (1)$$

where $s_{interact}$ is a distance from the position of the vehicle 128 output by the position estimator module 214, $v_i$ is the velocity assigned to the vehicle 128 by the velocity estimator module 218, $\tau$ is a reaction time of the vehicle 128 as output by the time estimator module 216, $t_{visible}$ is indicative of an amount of time between when the vehicle 128, travelling from the position output by the position estimator module 214, is able to observe the AV 110 (where $t_{visible}$ is a function of road geometry as indicated in the map 207 and path of the AV 110), and $a_{decel}$ is a deceleration assigned to the vehicle 128 by the reaction estimator module 212.

In another example, when the AV 110 is to drive across the second lane 106 of traffic (e.g., when performing a left turn across the second lane 106 of traffic), the reaction estimator module 212 can compute an amount of time until the vehicle 128 is expected to reach a predefined location (e.g., an intersection between two roadways). The reaction estimator module 212 can compute such amount of time based upon the position of the vehicle 128 output by the position identifier module 214, the estimated velocity of the vehicle 218 at such position as output by the velocity estimator module 218, a reaction time output by the reaction estimator module 216, an estimated deceleration of the vehicle 128, and a minimum threshold velocity of the vehicle 128 (wherein it is inferred that the velocity of the vehicle 128 will not drop below the minimum threshold velocity). Specifically, the reaction estimator module 212 can infer that the vehicle 128, when at the position computed by the position identifier module 208, is travelling at the velocity output by the velocity estimator module 218 in the second lane 106 towards the AV 110. The reaction estimator module 212 can further infer that the vehicle 128 will continue to travel at the velocity for the amount of time output by the time estimator module 216, and hence the reaction estimator module 212 can compute a second position for the vehicle 128 where the vehicle 128 is expected to begin slowing down. Based upon this second position, the estimated velocity, an estimated deceleration, the threshold minimum velocity of the vehicle 128, and the predefined location, the reaction estimator module 212 can compute a time when the vehicle 128 will reach the predefined location.

In a specific example, the reaction estimator module 212 can estimate velocity of the vehicle 128 at different points in time (from a current time) when the AV 110 is turning across a lane using the following algorithm:

$$v(t) = \begin{cases} v_i; 0 \leq t < \tau \\ a(t-\tau) + v_i; \tau \leq t < \frac{v_f - v_i}{a} \\ v_f; t > \frac{v_f - v_i}{a} \end{cases}, \quad (2)$$

where $v(t)$ is the velocity of the vehicle 128 at time t in the future (with 0 being a current time), $v_i$ is the initial velocity assigned to the vehicle 128 by the velocity estimator module 218, $v_f$ is the minimum threshold velocity referenced above (e.g., the final velocity that someone will slow to upon observing the AV 110), $\tau$ is the estimated reaction time output by the time estimator module 216), and a is a constant deceleration that is assigned to the vehicle 128 (until the vehicle reaches velocity $v_f$). Given an initial position assigned to the vehicle 128 by the position identifier module 214, $v(t)$ can be integrated to derive positions of the vehicle 128 in time, thus, the reaction estimator module 212 can compute a time when the vehicle 128 is expected to reach a predefined position.

The control system 124 can also include a completion estimator module 220 that is configured to compute: 1) a velocity curve for the AV 110 (wherein if the AV 110 follows the velocity curve the AV 110 is able to stop prior to the computed interaction point), wherein the velocity curve is computed based upon the AV profile 206 and the map 207; and/or 2) an amount of time needed by the AV 110 to pass the predefined location referenced above (e.g., an amount of time needed by the AV 110 to travel across the second lane 106 when performing a left turn), wherein the amount of time is computed based upon the AV profile 206 and the map 207. In the example depicted in FIG. 1, the AV 110 must enter the second lane 106 and travel in the direction of oncoming traffic for some unknown distance to navigate around the truck 108 and re-enter the first lane 104. Accordingly, in such example, the reaction estimator module 212 can compute the interaction point and the completion estimator module 220 can compute the velocity curve for the AV 110, wherein the velocity curve indicates how quickly the AV 110 can accelerate while still being able to stop prior to the interaction point. When the interaction point is behind the AV 110 and/or when the maximum velocity in the velocity curve is below a threshold, the AV 110 can refrain from entering the second lane 106. Instead, the AV 110 can move (within the first lane 104) to reduce an amount of the second lane 106 that is within the occluded region 126.

In another example scenario (referenced above), the AV 110 may need to take a left turn onto an intersecting street and therefore must cross the second lane 106. In such an example, the reaction estimator module 212 computes a time when the vehicle 128 is to reach a predefined location (e.g., the edge of the intersection), and the completion estimator module 220 computes an amount of needed by the AV 110 to clear the intersection. The completion estimator module 220 can compute this amount of time based upon the map 207 and content of the AV profile 206, such as the angle of the intersection, maximum velocity of the AV 110 when making the turn, physical profile of the AV 110 (length and width), and so forth.

The control system 124 additionally comprises a maneuver identifier module 222 that is configured to identify a maneuver that is to be undertaken by the AV 110 based upon the output of the reaction estimator module 212 and the output of the completion estimator module 220. In the scenario depicted in FIG. 1, for example, the maneuver identifier module 222 can determine that the AV 110 is to quickly accelerate and enter the second lane 106 based upon the velocity curve computed by the completion estimator module 220 and the interaction point computed by the reaction estimator module 210 (i.e., the maneuver identifier module 222 can determine that the AV 110 can quickly accelerate in an attempt to navigate around the truck 108 without colliding with any vehicle that may be in the occluded region 126, as the AV 110 will be able to stop before the computed interaction point). In the example where the AV 110 is to travel through the second lane 106 when making a turn, the maneuver identifier module 222 can ascertain whether or not the AV 110 is to immediately initiate the turn based upon the time values output by the reaction estimator module 212 and the completion estimator module 220 (i.e., the maneuver identifier module 222 can determine that the AV 110 is to perform the turn if there is sufficient time to complete the turn without fear of collision with any vehicle that may be in the occluded region 126). The control system 124 can control the mechanical system 116 of the AV 110 based upon the maneuver identified by the maneuver identifier module 222.

While the actions of the control system 124 have been described with respect to the vehicle 128, it is to be understood that the control system 124 can be configured to perform similar computations for a hypothetical bicyclist, pedestrian, and/or other road user that may be in the occluded region 126. For example, the reaction estimator module 212 can hypothesize that a bicyclist is travelling at a "worst-case" position in the occluded region 126 relative to the AV 110 (e.g., right beside the truck 108 in the first lane 104 but travelling towards the AV 110). The reaction estimator module 212 can then infer a reaction of the bicyclist to the AV 110, as described above with respect to the vehicle 128 (where the reaction can include the interaction point or the time when the bicyclist is estimated to reach a predefined location). The completion estimator module 220 can act as described above, and the maneuver identifier module 222 can select a maneuver for the AV 110 to undertake based upon outputs of the reaction estimator module 212 and the completion estimator module 220. Additionally, as mentioned above, the control system 124 can assess risk that a moving pedestrian is in the occluded region 126, a stationary pedestrian is in the occluded region 126, that an animal is in the occluded region 126, and so forth, and can control operation of the AV 110 based upon this assessed risk.

Figure 3:
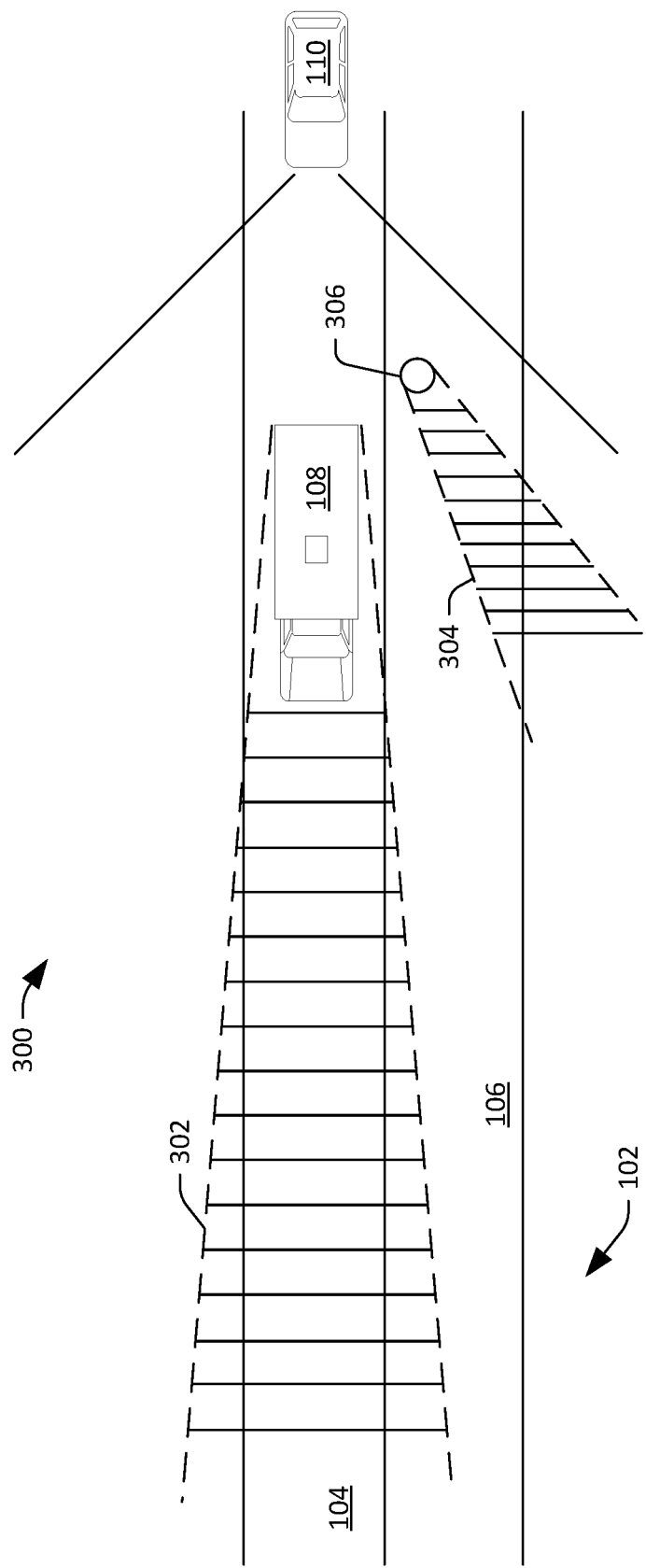
FIG. 3 is a schematic that illustrates multiple regions that are occluded by objects in a field of view of a sensor of an AV.

Referring now to FIG. 3, a schematic illustrating an exemplary driving environment 300 for the AV 110 is illustrated. In the environment 300, there are two occluded regions from the perspective of the AV 110: a first occluded region 302 caused by the location of the truck 108 relative to the location of the AV 110 and a second occluded region 304 caused by location of a traffic barrel 306 in the second lane 106 of the roadway 102. The control system 124 can perform the processing described above for each of the occluded regions 302 and 304 simultaneously, and the control system 124 can control the AV 110 to minimize risk while still allowing the AV 110 to maneuver in the environment 300. For instance, the reaction estimator module 212 can compute two interaction points: a first interaction point for a vehicle that may be included in the occluded region 302 and a second interaction point for a bicyclist that may be included in the occluded region 304. The completion estimator module 220 can then compute two velocity curves: a first velocity curve that corresponds to the first interaction point and a second velocity curve that corresponds to the second interaction point. The maneuver identifier module 222 can select a maneuver to be performed by the AV 110 based upon the first velocity curve and the second velocity curve—that is, the maneuver identifier module 222 can select the maneuver that is associated with the least amount of risk. For example, the maneuver identifier module 222 can select a maneuver corresponding to the velocity curve that allows the AV 110 to come to a stop most quickly. The control system 124 can then control the AV 110 based upon the maneuver selected by the maneuver identifier module 222.

Figure 6:
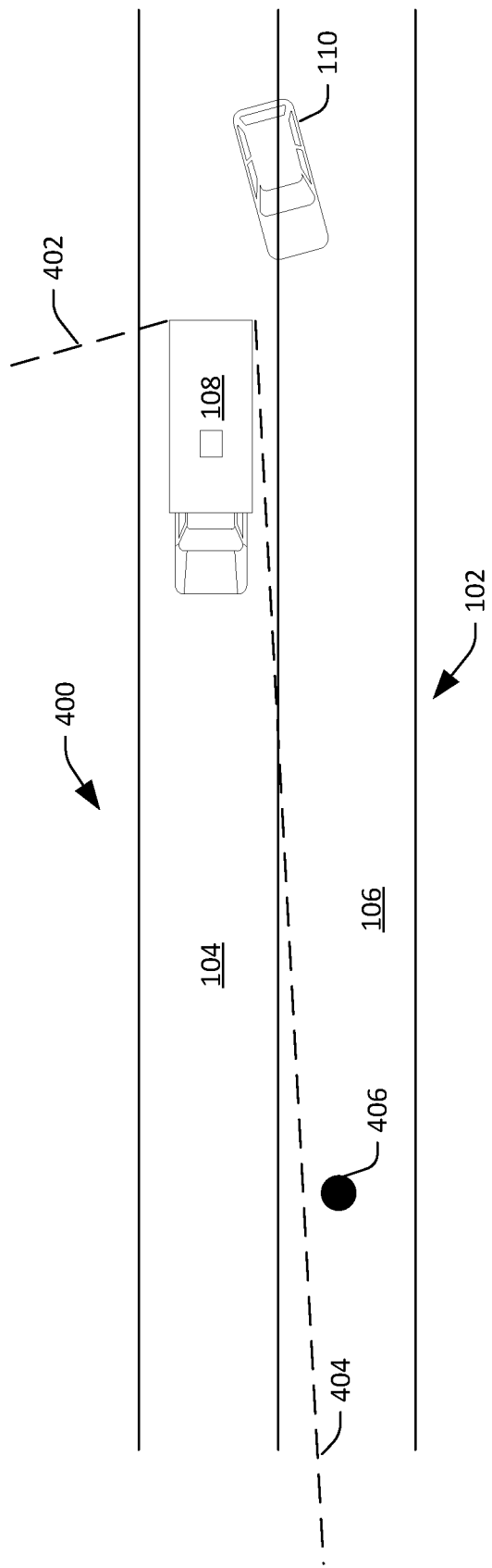

Referring now to FIGS. 4-6, schematics illustrating an exemplary driving environment 400 of the AV 110 are presented. With reference solely to FIG. 4, the AV 110 is traveling in the first lane 104 of the roadway 102 and comes upon the truck 108, resulting in an occluded region (represented by dashed lines 402 and 404) from the perspective of the AV 110. As described above, the reaction estimator module 212 infers a reaction of the (hypothetical) vehicle 128 to the AV 110. More specifically, the position identifier module 214 computes the position of the vehicle 128, wherein the vehicle 128 is in the occluded region yet the AV 110 is observable to the vehicle 128. The velocity estimator module 218 estimates the velocity of the vehicle 128 (and assumes that the vehicle 128 is travelling at a constant velocity) at the computed position, and the time estimator module 216 outputs an estimated reaction time for vehicle 128. The reaction estimator module 212 computes an interaction point 406 based upon such outputs, wherein the interaction point 406 represents a location where the vehicle 128 (if it exists in the occluded region) is expected to cease moving.

The completion estimator module 220 identifies a velocity curve for the AV 110, wherein the AV 110 can accelerate according to the velocity curve, exit the first lane 104, enter the second lane 106, and decelerate according to the velocity curve to stop prior to reaching the interaction point 406. Hence, despite not being able to "see" around the truck 108, the AV 110 can nevertheless assess risk as to exiting the first lane 104 and entering the second lane 106 to navigate around the truck 108, and then maneuver in accordance with the assessed risk.

Turning to FIG. 5, in the illustrated example, the AV 110 begins to maneuver towards the second lane 106 (to get around the truck 108), which alters the position of the AV 110 relative to the truck 108, which in turn causes boundaries of the occluded region to change (as can be ascertained through a comparison between FIGS. 4 and 5). Further, as depicted in FIG. 5, there is still no other road users that are in the second lane 106 and not in the occluded region. Accordingly, the reaction estimator module 212 performs the operations described above to recompute the interaction point 406 (which is now further from the AV 110). The completion estimator module 220 recomputes the velocity curve for the AV 110 based upon the recomputed interaction point 406, and the maneuver identifier module 222 identifies a maneuver to be undertaken by the AV 110 based upon the recomputed velocity curve.

Referring now to FIG. 6, the AV 110 is illustrated as exiting the first lane 104 and entering the second lane 106 of the roadway 102 (and operating in accordance with a computed velocity curve). Again, this alters the position of the AV 110 relative to the truck 108, which in turn alters the boundaries 402 and 404 of the occluded region. The reaction estimator module 212 recomputes the interaction point 406 (which is again further from the AV 110), and the completion estimator module 220 recomputes the velocity curve based upon such interaction point 406. The maneuver identifier module 222 identifies a driving maneuver for the AV 110, wherein the driving maneuver is selected to cause the AV 110 navigate around the truck 108 as quickly as possible while considering risk of collision with a (occluded) vehicle traveling in the opposite direction in the second lane 106. While not shown, if as the AV 110 enters the second lane 106 and the sensor signal output by the sensor 114 indicates presence of an oncoming vehicle in the second lane 106, the control system 124 can control operation of the AV 110 based upon the sensor signal. For example, the control system 124 may cause the AV 110 to reenter the first lane 104. In another example, the control system 124 can cause the AV 110 to drive slowly and close to the side of the truck 108, such that the vehicle in the second lane 106 is able to navigate around the AV 110.

Figure 7:
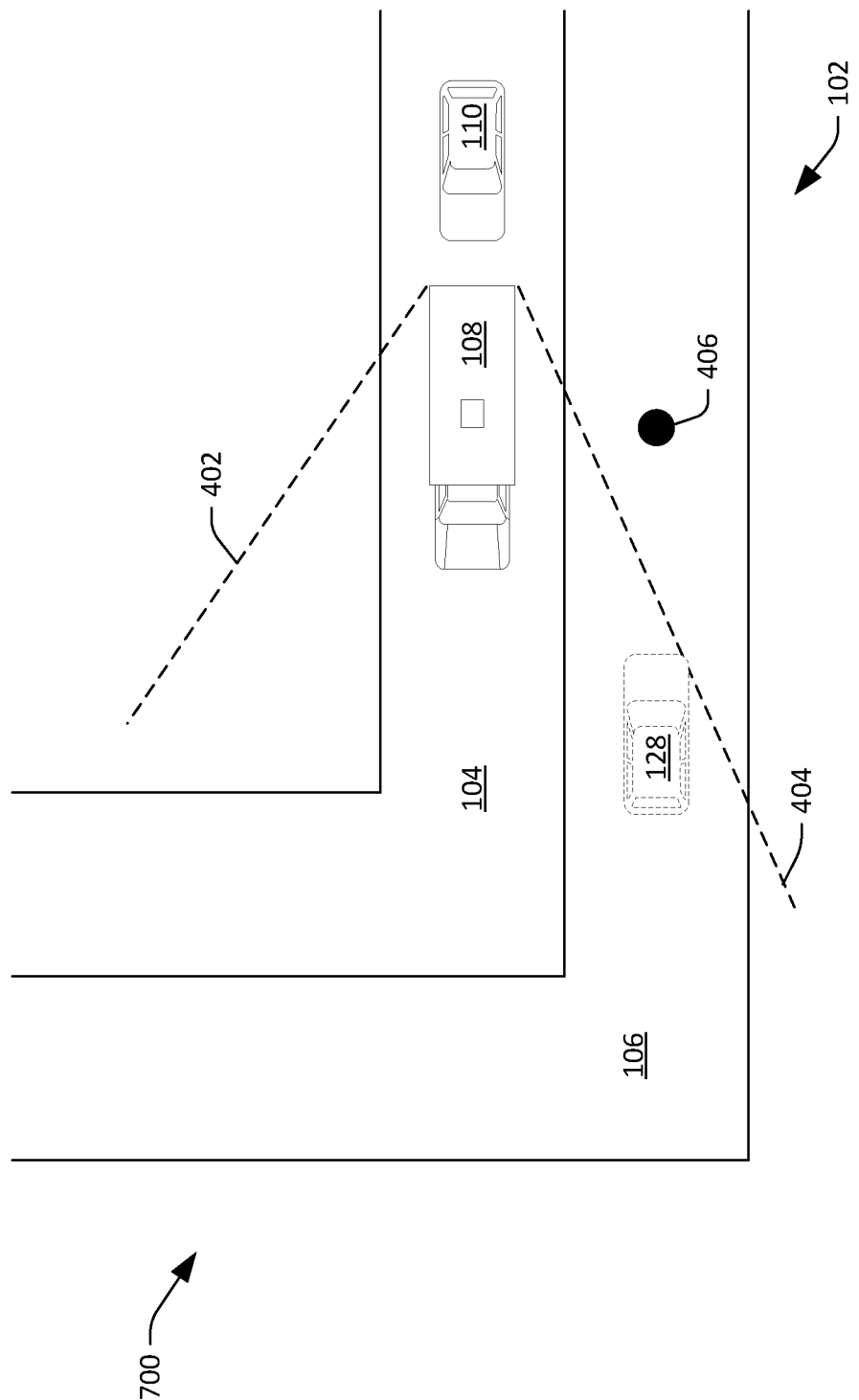
FIGS. 7-9 are schematics that illustrate exemplary operation of an AV upon the AV identifying an occluded region, wherein the AV operates based upon roadway geometries.

Referring now to FIG. 7, another exemplary driving environment 700 is depicted. In the exemplary driving environment 700, the roadway 102 includes a curved portion. The reaction estimator module 212 can take into consideration the geometry of the roadway 102 when estimating the reaction of the (hypothetical) vehicle 128. For instance, the velocity estimator module 218 can take into consideration geometry of the roadway 102 when estimating the velocity of the hypothetical vehicle 128 in the occluded region. While the roadway 102 is illustrated as being curved, other road geometries are also contemplated, such as changes in elevation. The reaction estimator module 212 can ascertain the road geometries based upon the map 207 that is retained in the data store 202. Thus, the reaction estimator module 212 can compute the interaction point 406 based upon the road geometries represented in the map 207. In addition, the completion estimator module 220 can compute the velocity curve based upon the road geometries represented in the map 207. For example, the completion estimator module 220 can ascertain that the AV 110 will have to sharply turn right a relatively short distance from the AV 110. Accordingly, the completion estimator module 220 can determine a maximum velocity for the AV 110 when navigating around the truck 108 (such that the AV 110 is traveling slowly enough to safely navigate the curve in the roadway 102).

Figure 8:
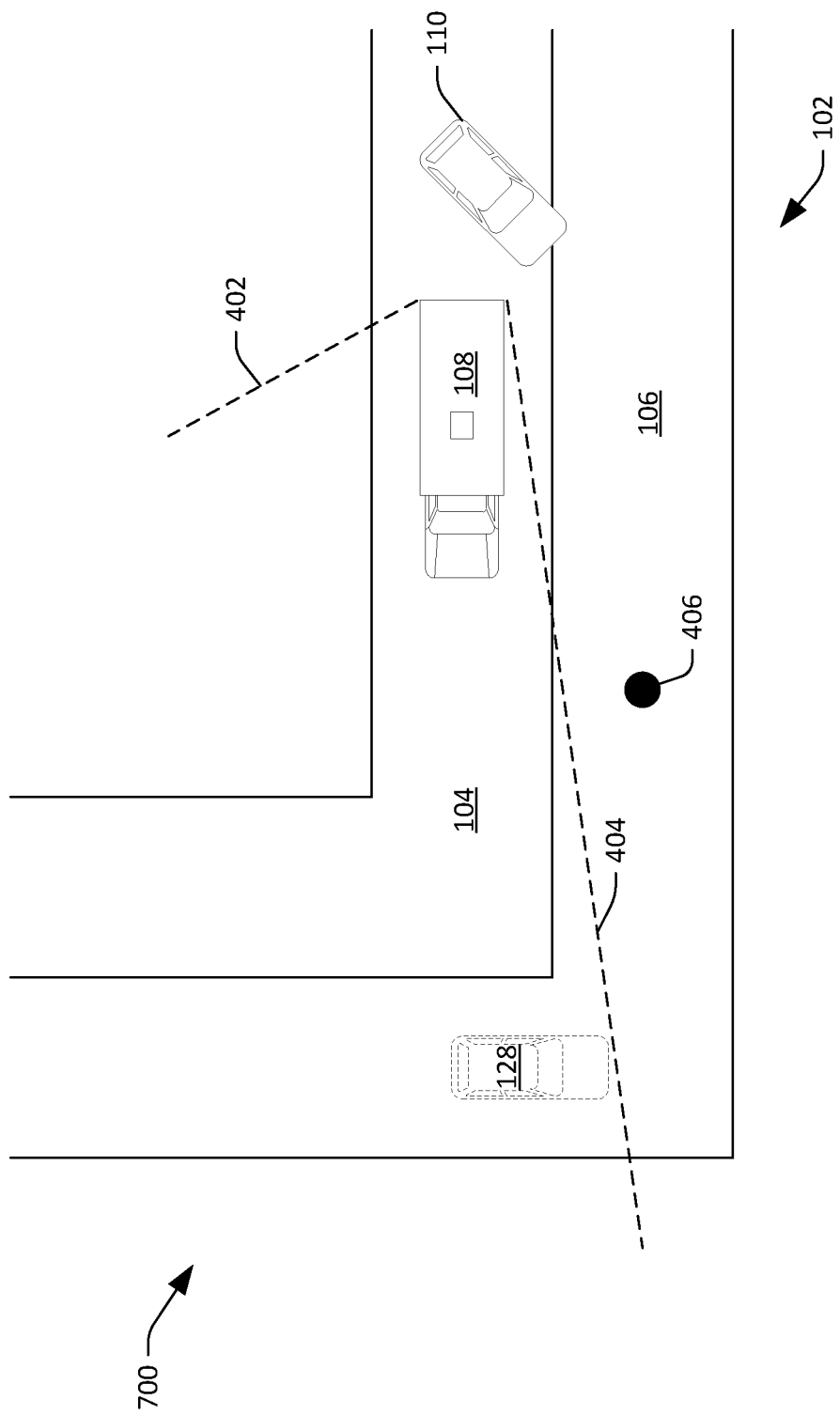

With reference now to FIG. 8, the environment 700 is again depicted, wherein the AV 110 has begun to move around the truck 108, which causes the boundaries of the occluded region to be altered. Based upon the geometry of the roadway 102, the position identifier module 214 updates position of the (hypothetical) vehicle 128 in the occluded region. In other words, the position identifier module 214 computes the position of the vehicle 128 as being around the curve of the roadway 102, which can impact the velocity output by the velocity estimator module 218. The reaction estimator module 212 computes the interaction point 406 and the completion estimator module 220 computes the velocity curve for the AV 110 based upon the interaction point 406.

Figure 9:
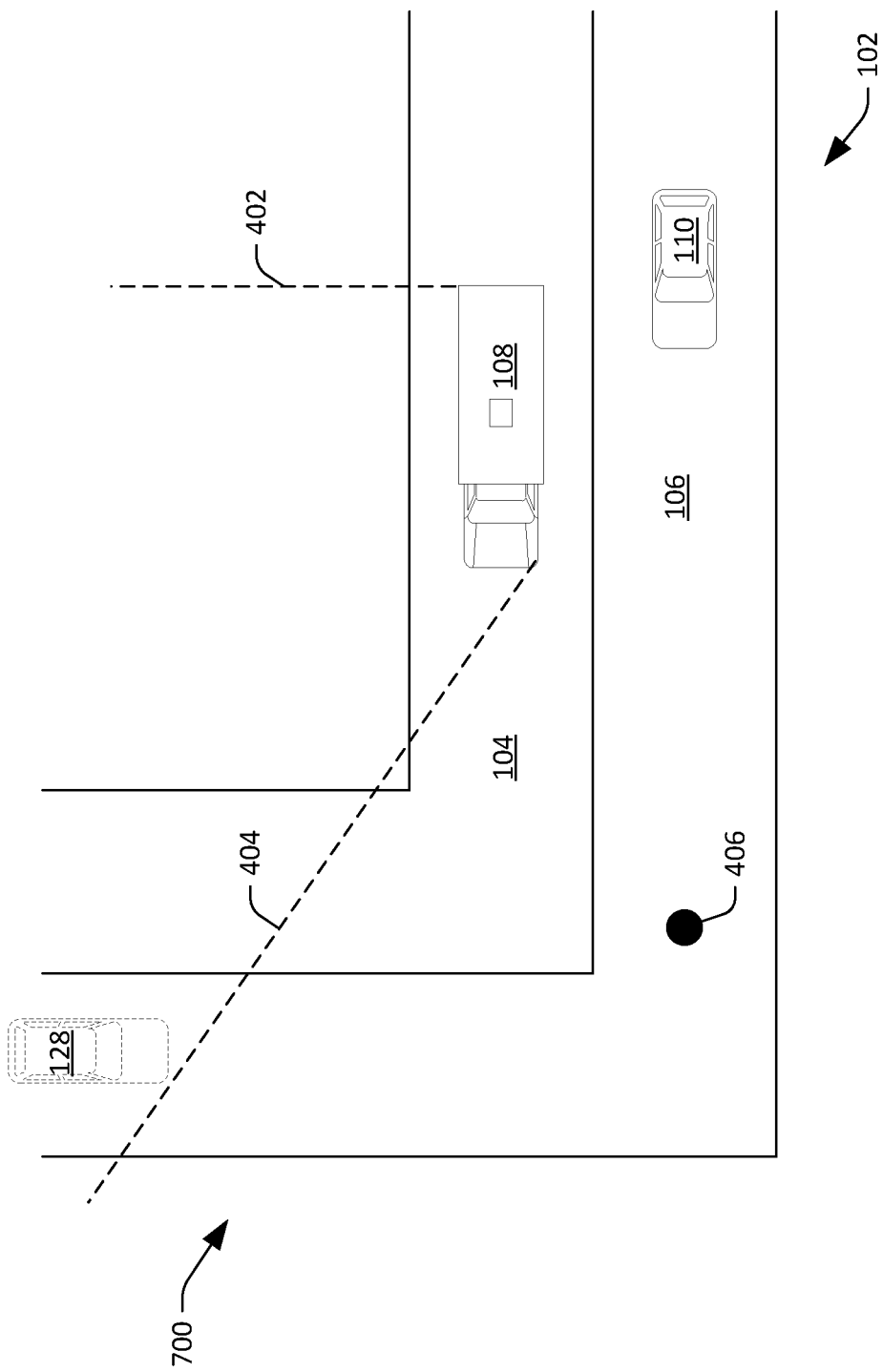

FIG. 9 again depicts the driving environment 700, wherein the AV 110 has exited the first lane 104 and entered the second lane 106 of the roadway 102. The position identifier module 214 updates the position of the vehicle 128 in the occluded region, and the reaction estimator module 212 recomputes the interaction point 408 based upon the updated position of the vehicle 128 (and the map 207).

Figure 10:
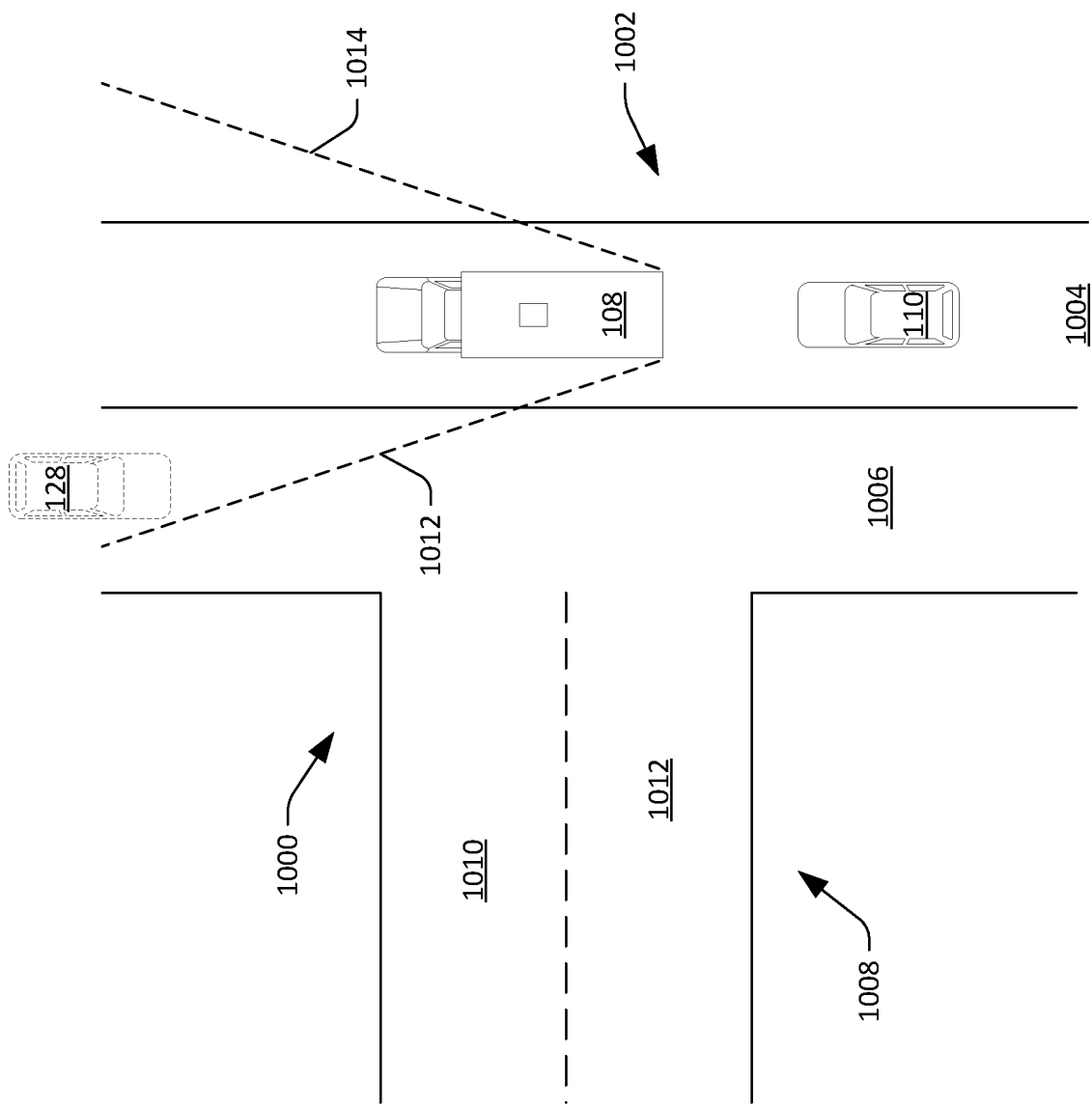
FIGS. 10-11 are schematics that illustrate exemplary operation of an AV upon the AV identifying an occluded region, wherein the AV is attempting to complete a turn across a lane of oncoming traffic.

With reference now to FIG. 10, another exemplary driving environment 1000 is illustrated, wherein the AV 110 is to perform a left turn through an intersection, and further wherein vehicles in oncoming traffic are not required to stop at the intersection. With more particularity, the AV 110 is driving along a first roadway 1002 that includes a first lane 1004 (in which the AV 110 is traveling in a first direction) and a second lane 1006 (wherein vehicles in the second lane 1006 travel in a second direction that is opposite the first direction). The driving environment 1000 further includes a second roadway 1008, wherein the second roadway 1008 includes a first lane 1010 and a second lane 1012, wherein vehicles enter the second roadway 1008 from the first roadway 1002 in the first lane 1010 and vehicles exit the second roadway 1008 from the second lane 1012 to enter the first roadway 1002. In the example illustrated in FIG. 10, the AV 110, to reach its intended destination, is to perform a left turn to exit the first lane 1004 of the first roadway 1002, travel across the second lane 1006 of the first roadway 1002, and enter the first lane 1010 of the second roadway 1008.

The object identifier module 208 can identify the truck 108 in a field of view of the sensor 114. The occluded region definer model 210 defines an occluded region in the field of view of the sensor 114 (where the occluded region is caused by the position of the AV 110 relative to the position of the truck 108), wherein the occluded region is represented by dashed lines 1012 and 1014. The reaction estimator module 212 then hypothesizes that the vehicle 128 exists in the occluded region and is traveling towards the AV 110 in the second lane 1006 of the first roadway 1002. With more particularity, the position identifier module 214 computes a position of the vehicle 128 in the occluded region (where the driver of the vehicle 128 is expected to first observe the AV 110), the velocity estimator module 218 estimates a velocity of the vehicle 218, and the time estimator module 216 estimates a reaction time of the driver of the vehicle 128.

In contrast to the driving scenario 400, in the driving scenario 1000 the reaction estimator module 212 does not assume that the vehicle 128 is willing to stop upon observing the AV 110. Instead, the reaction estimator module 212 infers that the vehicle 128 will slow to some threshold minimum velocity upon observing the AV 110. For instance, the reaction estimator module 212 can assume that the vehicle 128 will slow to 18 miles per hour from an initial velocity of 25 miles per hour at a deceleration rate. The reaction estimator module 212 can further assume that when the vehicle 128 reaches the minimum velocity, the vehicle 128 will continue to travel at that minimum velocity until the AV 110 has passed through the intersection between the roadways 1002 and 1008. The completion estimator module 220 can compute an amount of time required for the AV 110 to complete the left-hand turn, such that the entirety of the AV 110 is out of the second lane 1006 of the first roadway 1002. The completion estimator module 220 can compute such amount of time based upon a current location and orientation of the AV 110, the map 207, and content of the AV profile 206. The map 207 can indicate an angle between the roadways 1002 and 1008, and the AV profile 206 can indicate a physical profile of the AV 110, a maximum acceleration of the AV 110 with respect to the turn that the AV 110 is to make, a maximum velocity of the AV 110 when making the turn, and so forth. The completion estimator module 220 can loosen certain constraints when computing the aforementioned amount of time; for instance, the completion estimator module 220 can loosen boundary constraints, such that the completion estimator module 220 can compute the amount of time required for the AV 110 to complete the turn if the AV 110 turns more sharply than normal.

Based upon the amount of time required for the AV 110 to complete the left-hand turn as computed by the completion estimator module 220, and further based upon the estimated time when the hypothetical vehicle 128 will reach the intersection as computed by the reaction estimator module 212, the maneuver identifier module 222 can identify a maneuver to be performed by AV 110. For example, the maneuver identifier module 222 can ascertain that the AV 110 is to perform the left-hand turn when the times output by the reaction estimator module 212 and the completion estimator module 220 indicate that the AV 110 will complete the left-hand turn well before any possible collision between the AV 110 and the (hypothetical) vehicle 128. For example, the maneuver identifier module 222 can identify that the AV 110 is to perform the left-hand turn when there is at least an N second gap between when the AV 110 will have completed the left-hand turn and when the (hypothetical) vehicle 128 is estimated to reach the intersection.

In another example, based upon the times computed by the reaction estimator module 212 and the completion estimator module 220, the maneuver identifier module 222 can determine that the risk of collision is too high, and can identify a maneuver that causes the AV 110 to improve its view of the second lane 1006 of the first roadway 1002. Thus, the maneuver identifier module 222 can identify a driving maneuver that causes the AV 110 to slowly move towards the second lane 1006 of the first roadway 1002 such that the portion of the second lane 1006 included in the occluded region is reduced.

Figure 11:
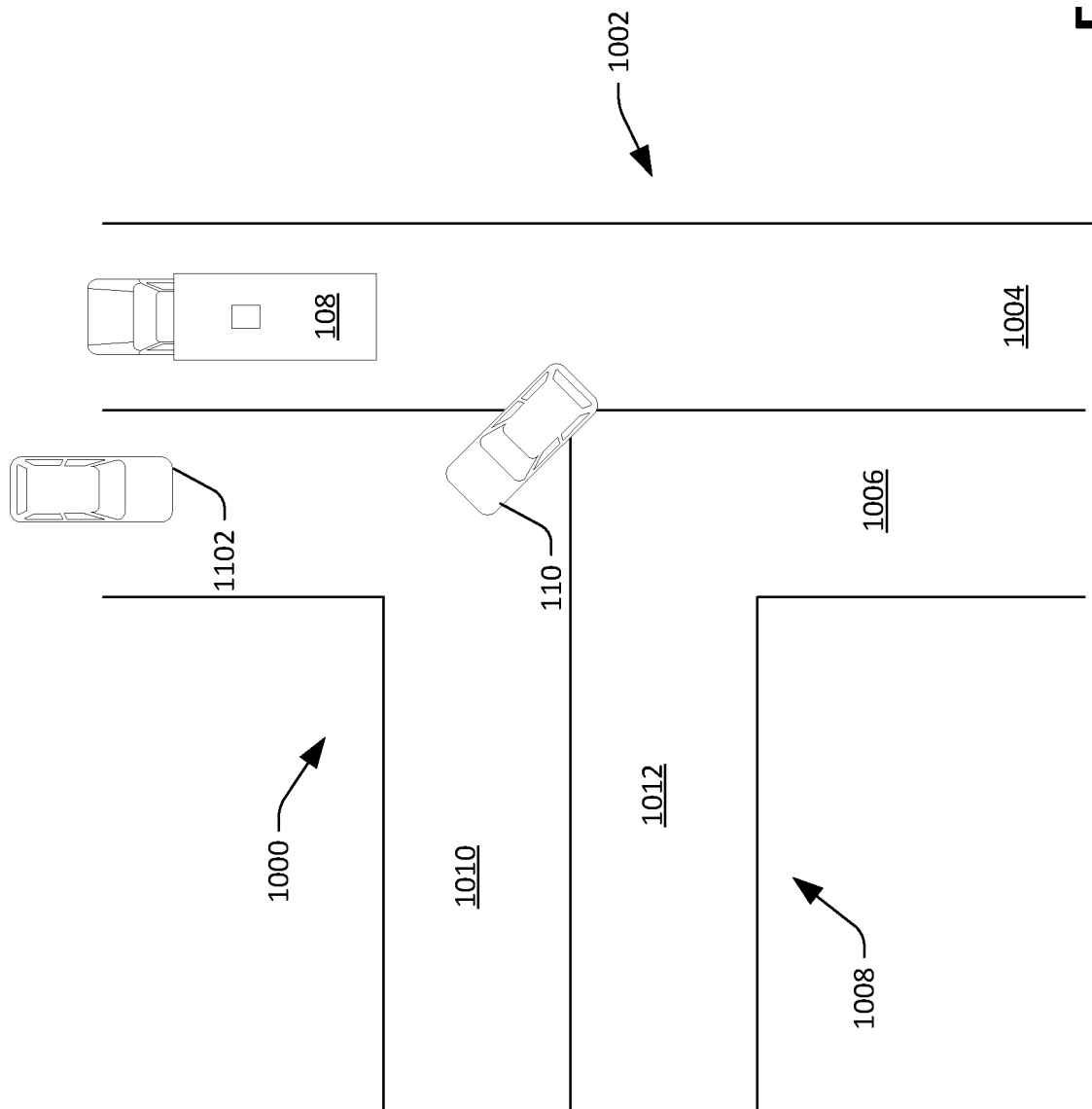

FIG. 11 depicts the driving environment 1000, wherein the maneuver identifier module 222 has identified that the AV 110 is to perform the left-hand turn and the control system 124 controls the mechanical system 116 of the AV 110 in connection with completing the left-hand turn. As illustrated in FIG. 11, a vehicle 1102 is traveling in the second lane 1006 of the first roadway 1002. The AV 110 is able to safely complete the maneuver prior to the vehicle 1102 reaching the intersection between the first roadway 1002 and the second roadway 1008 (as ascertained by the maneuver identifier module 222). While FIGS. 10 and 11 depict the driving environment 1000 where the AV 110 is making a left hand turn across a lane of traffic, it is to be understood that the technologies can be employed when the AV 110 is making a right-hand turn across a lane of traffic.

Figure 12:
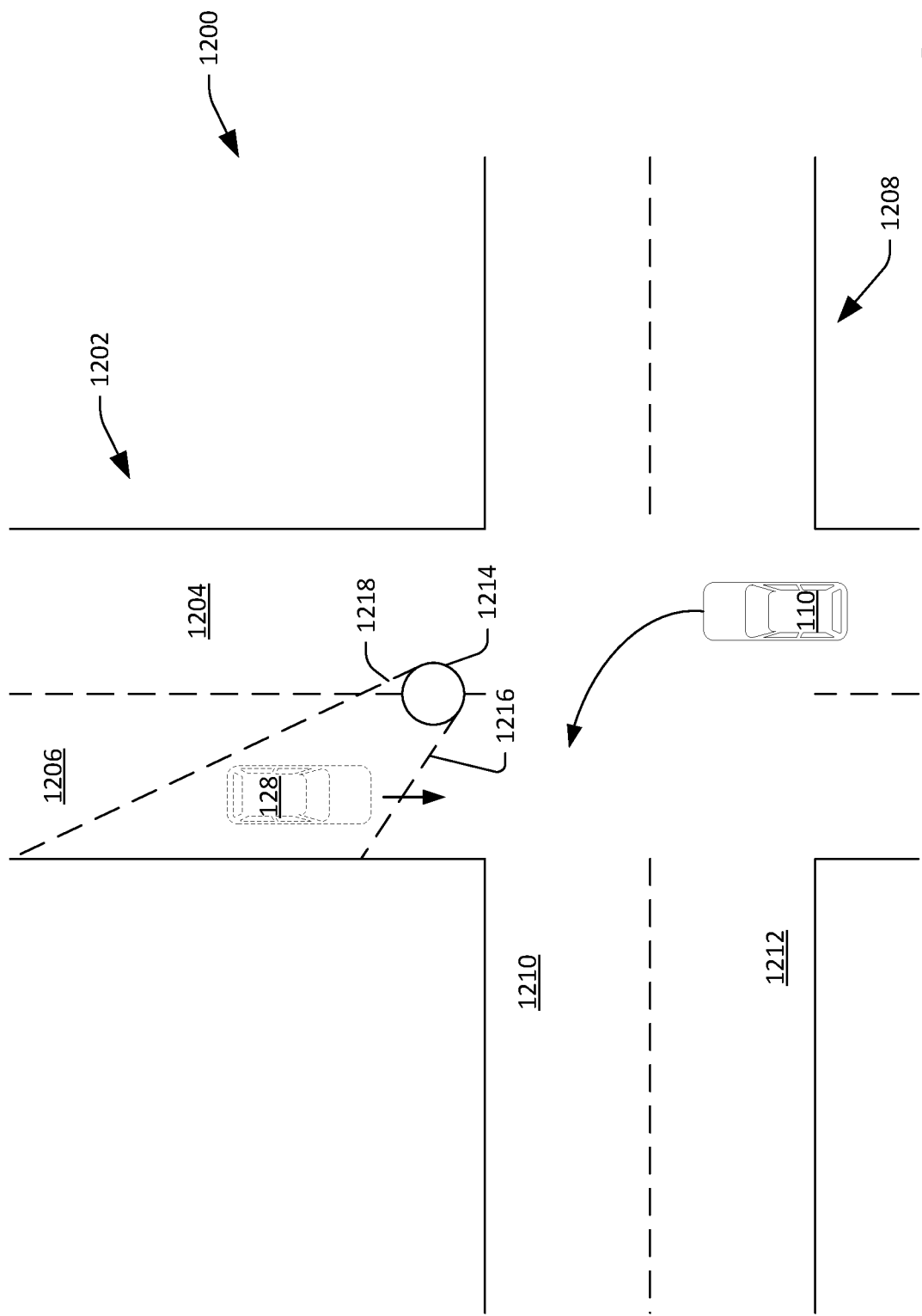
FIG. 12 is a schematic that illustrates exemplary operation of an AV at an intersection where an occluded region exists from the perspective of the AV.

Reference is now made to FIG. 12, where another driving environment 1200 is depicted. The driving environment 1200 includes a first roadway 1202 that includes a first lane 1204 (where the AV 110 is travelling in the first lane 1204) and a second lane 1206, where traffic flows in opposite directions in the first lane 1204 and the second lane 1206. The environment 1200 additionally includes a second roadway 1208 that intersections the first roadway 1202, wherein the second roadway 1208 includes a first lane 1210 and a second lane 1212. In the illustrated environment 1200, the AV 110 is travelling in the first lane 1204 of the first roadway and intends to enter the first lane 1210 of the second roadway 1208, such that the AV 110 is to cross the second lane 1206 of the first roadway 1202.

An obstruction 1214, such as a bridge support, a pole, or the like, exists in the first roadway 1202, which causes an occluded region (with boundaries represented by dashed lines 1216 and 1218) to exist from the perspective of the AV 110. The AV 110 can ascertain that the occluded region covers a portion of the second lane 1206 of the first roadway 1202, wherein the portion is large enough to include a road user (e.g., the vehicle 128). The AV 110 acts as described above, wherein the occluded region definer module 210 defines the occluded region, the reaction estimator module 212 infers a reaction of the vehicle 128 to the AV 110, and the completion estimator module 220 computes a time needed by the AV 110 to complete the above-referenced turn. The maneuver identifier module 222 identifies a maneuver to be performed by the AV 110 based upon the time computed by the reaction estimator module 212 for the (hypothetical) vehicle 128 to reach the intersection between the roadways 1202 and 1208 and further based upon the time needed by the AV 110 to complete the turn as computed by the completion estimator module 220. The control system 124 controls the AV 110 based upon the maneuver identified by the maneuver identifier module 222.

Figure 13:
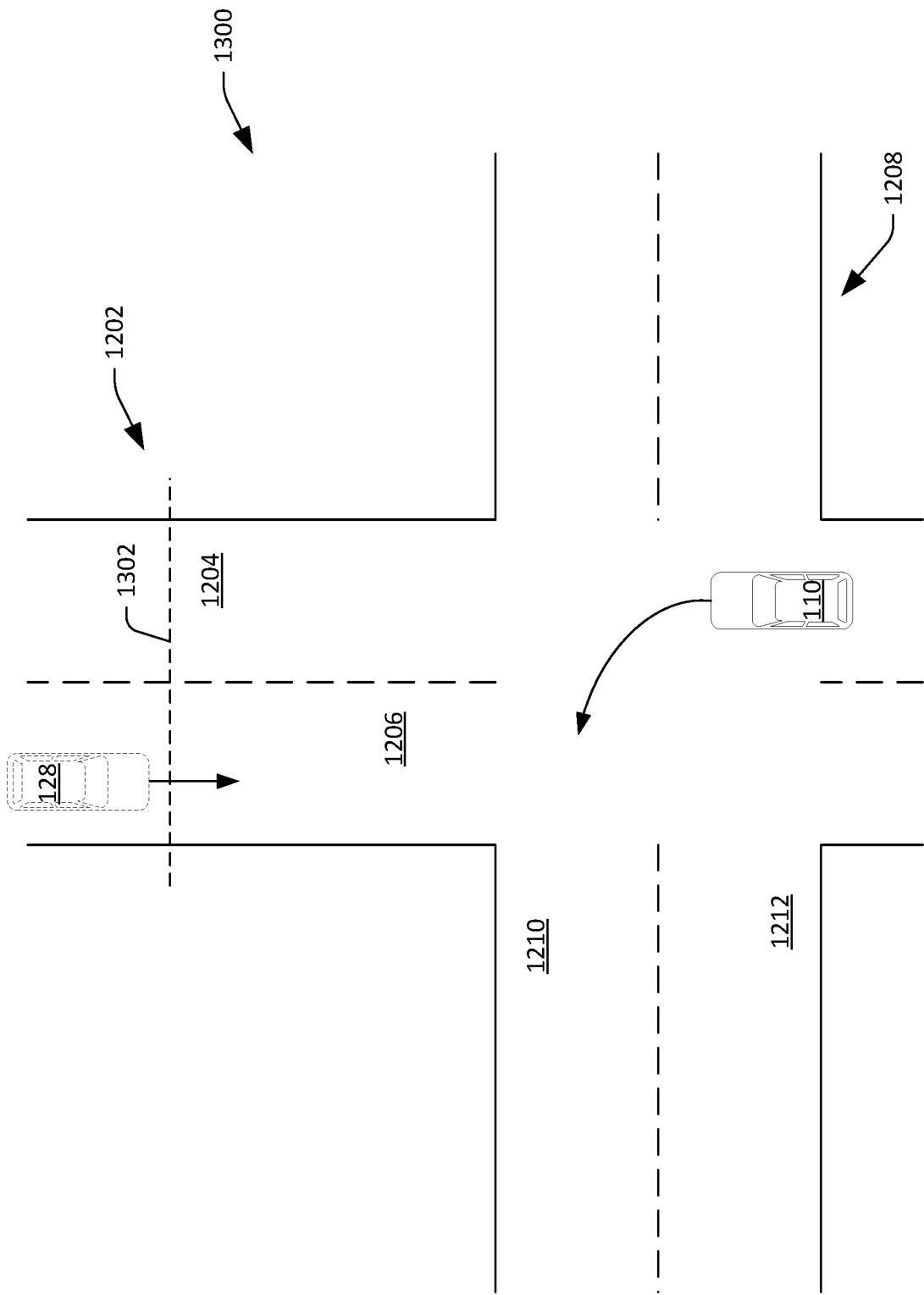
FIG. 13 is a schematic that illustrates exemplary operation of an AV when an occluded region exists from the perspective of the AV, wherein the occluded region is caused by environmental factors and/or sensor limitations.

Now referring to FIG. 13, another exemplary driving environment 1300 is depicted. The driving environment includes the roadways 1202 and 1208, as well as the lanes 1204, 1206, 1210, and 1212 of the roadways 1202 and 1208, respectively. In the example depicted in FIG. 13, the AV 110 intends to exit the first roadway 1202 and enter the second roadway 1208 through the intersection, and thus intends to cross the second lane 1206 of the first roadway 1202. Inherent sensor limitations and/or environmental conditions (such as fog) result in an occluded region (with a boundary represented by dashed line 1302) at some distance from the AV 110, wherein the occluded region includes a portion of the second lane 1206 of the first roadway 1202. For instance, the sensor 114 may be configured to generate data up to a particular distance D, such that the occluded region exists beyond such distance from the AV 110.

The occluded region definer module 210 can define the occluded region based upon data received from sensors of the AV 110 and the map 207. The position identifier module 214 can position the hypothetical vehicle 128 at the boundary of the occluded region, just outside of where the vehicle 128 would otherwise be visible to the AV 110. The time estimator module 216 and the velocity estimator module 218 can act as described above, and the reaction estimator module 212 can compute a time when the vehicle 128 will reach the intersection between the roadways 1202 and 1208. The completion estimator module 220 can compute a time when the AV 110 is expected to complete the turn, and the maneuver identifier module 222 can identify a maneuver to be performed by the AV 110 based upon the time computed by the reaction estimator module 212 and the time computed by the completion estimator module 220. The control system 124 controls the mechanical system 116 in accordance with the identified maneuver.

Figure 14:
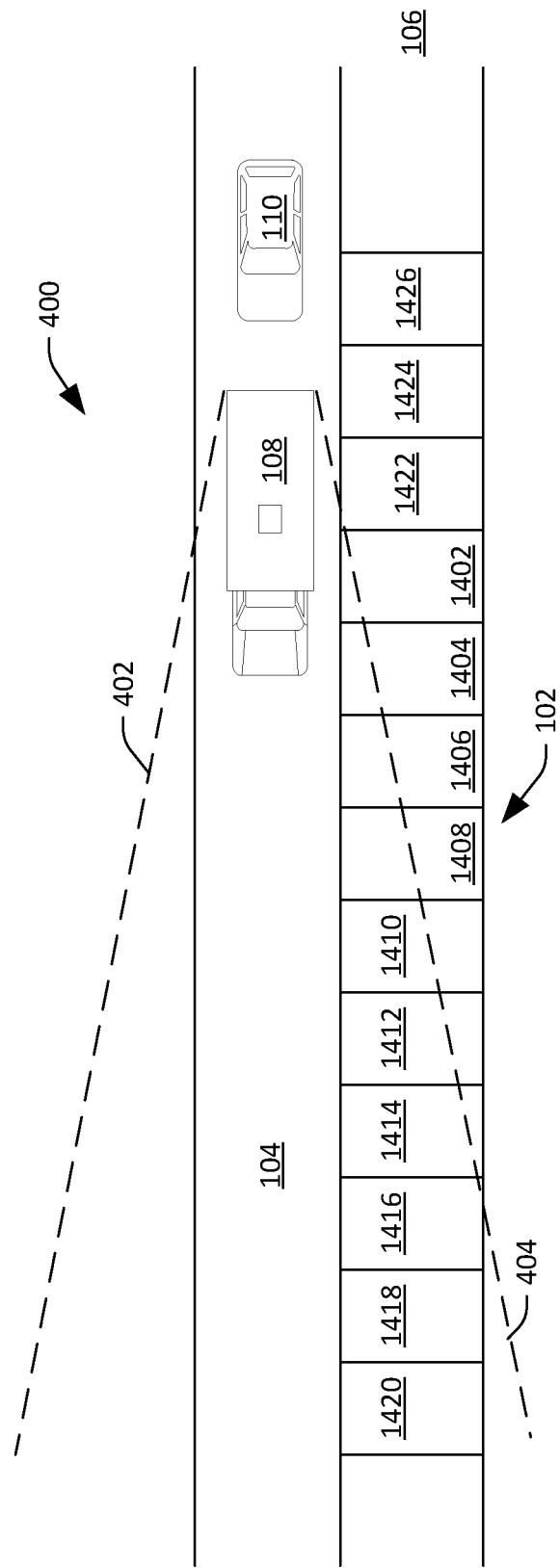
FIG. 14 is a schematic that depicts a portion of roadway that is partitioned into bands.

Turning to FIG. 14, the driving environment 400 is again depicted. In the exemplary driving environment 400, the AV 110 defines the occluded region (represented by the dashed lines 402 and 404), wherein the occluded region includes several occlusion bands 1402-1420. In an exemplary embodiment, in the map 207, roadways can be partitioned into several bands across a width of lanes of the roadways, wherein these regions can have predefined lengths. When the occluded region definer module 210 ascertains that an occluded region exists that covers a portion of a lane of a roadway, the occluded region definer module 210 can label the bands of the roadway that are entirely or partially included in the occluded region as an occlusion band. Hence, in the example shown in FIG. 14, the bands 1402-1420 can be labeled as occlusion bands, while bands 1422-1426 are not labeled as occlusion bands. Partitioning roadways in this manner and labeling of bands as being occlusion bands (or not occlusion bands) is associated with processing advantages and allows for tracking of occlusion bands over time.

Figure 15:
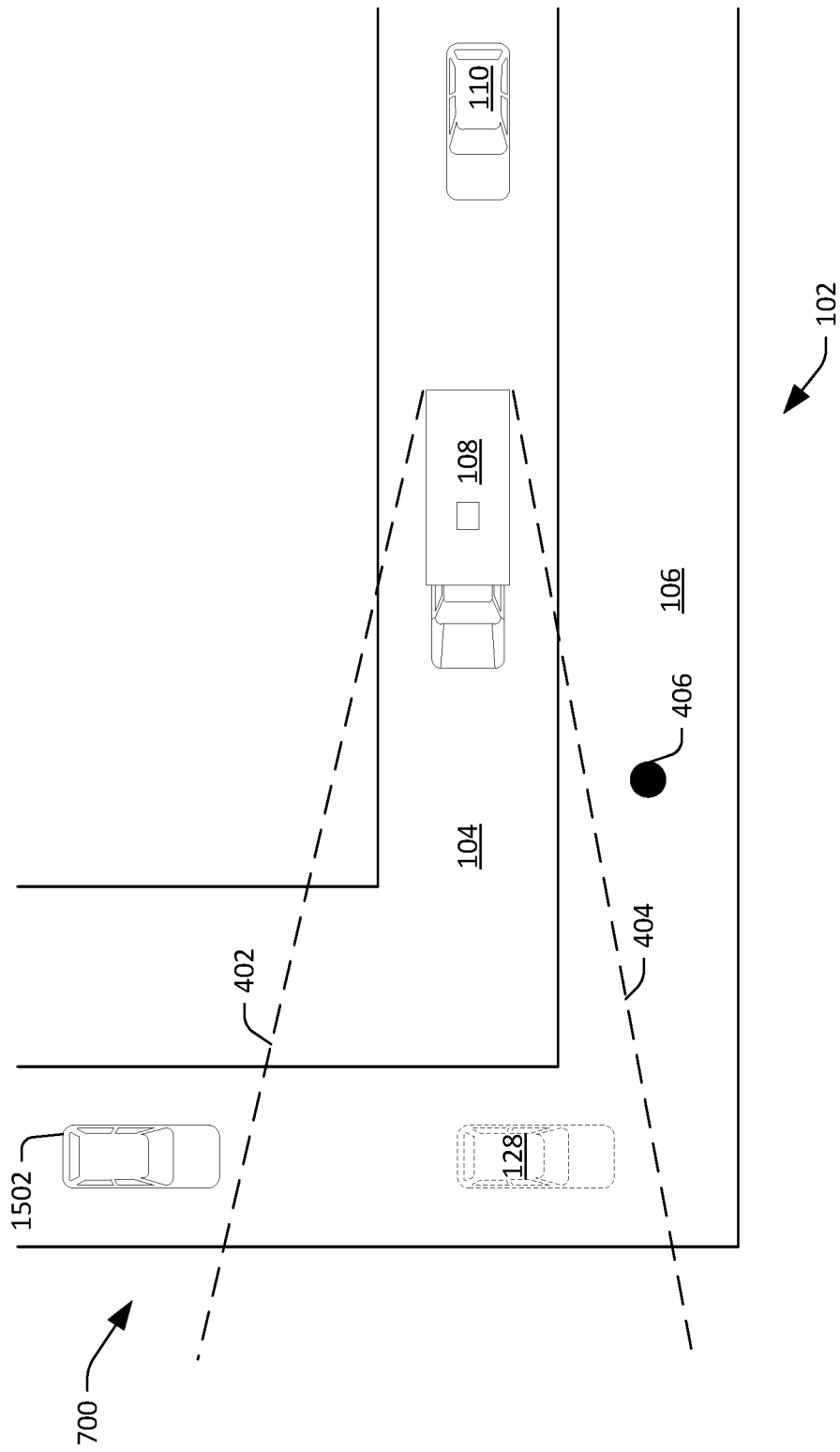
FIG. 15 is a schematic that illustrates operation of an AV upon the AV identifying an occluded region and further upon the AV observing an object entering the occluded region.

Referring now to FIG. 15, the driving environment 700 is again illustrated, wherein a roadway both enters and exits the occluded region (represented by the dashed lines 402 and 404). Thus, the AV 110 has visibility as to vehicles entering the occluded region in the second lane 1006 and additionally has visibility as to vehicles exiting the occluded region in the second lane 1006, but lacks visibility in the occluded region itself. In the example shown in FIG. 15, at a first point in time the AV detects a vehicle 1502 entering the occluded region at some velocity and acceleration. When the vehicle 1502 is in the occluded region, the reaction estimator module 212 can compute the interaction point 406 based upon observations about the vehicle 1502 as the vehicle entered the occluded region (as well as road geometry). As time passes, the reaction estimator module 212 can update estimates as to the (hypothetical) vehicle 128 in the occluded region. For example, if over some period of time the AV 110 does not observe a vehicle entering the occluded region, the AV 110 can estimate that the (hypothetical) vehicle 128 is either stopped or moving very slowly. Similarly, when the AV 110 observes the vehicle 1502 entering the occluded region but does not observe a vehicle exiting the occluded region after some period of time, the AV 110 can infer that the vehicle 1502 has stopped in the occluded region or is travelling very slowly in the occluded region. The reaction estimator module 212 can recompute the interaction point 406 over time based upon observations as to road users that have entered the occluded region, and the completion estimator module 220 can compute a velocity curve for the AV 110 based upon the interaction point 406.

Figure 16:
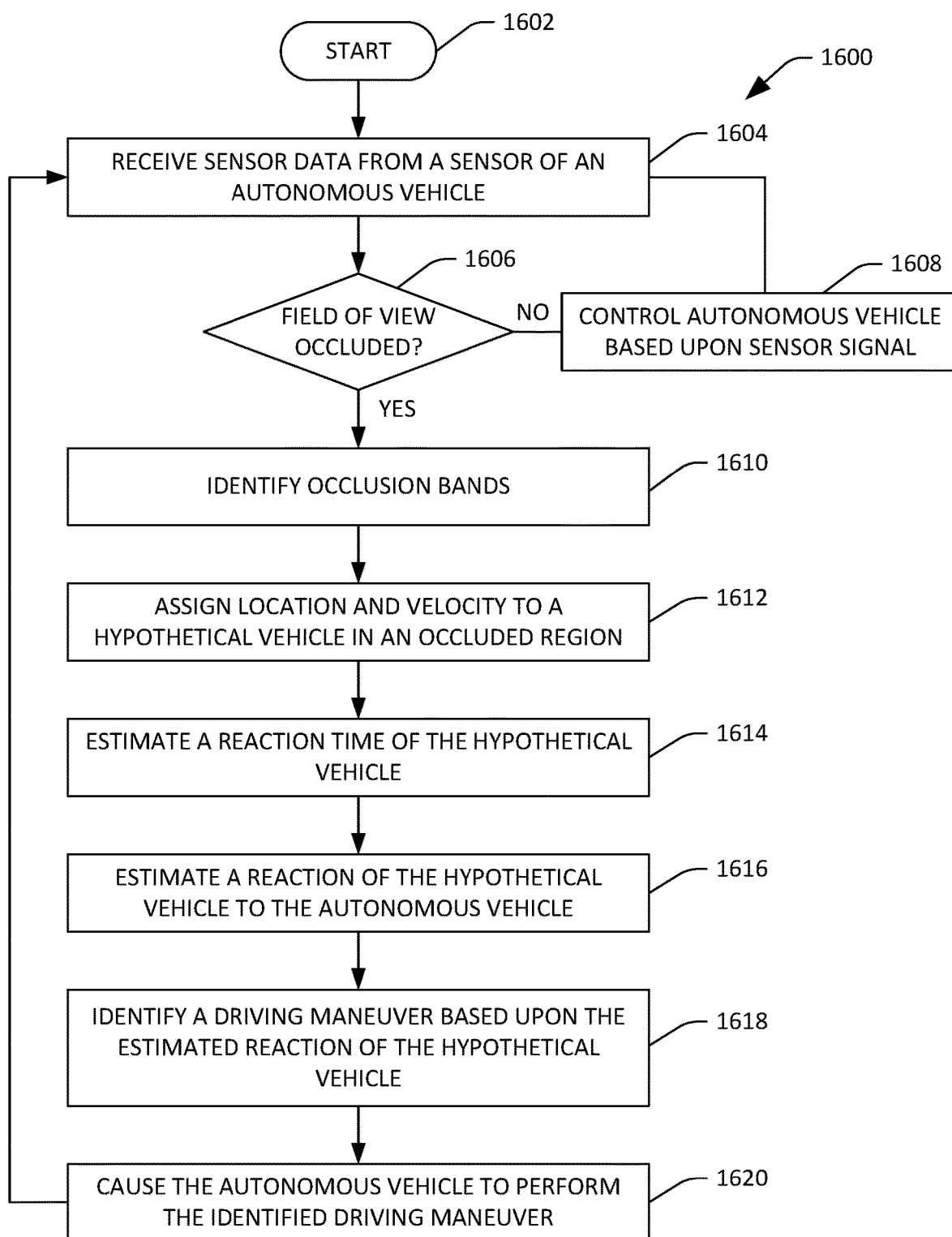
FIG. 16 is a flow diagram that illustrates an exemplary methodology performed by an AV upon the AV identifying an occluded region.
Figure 17:
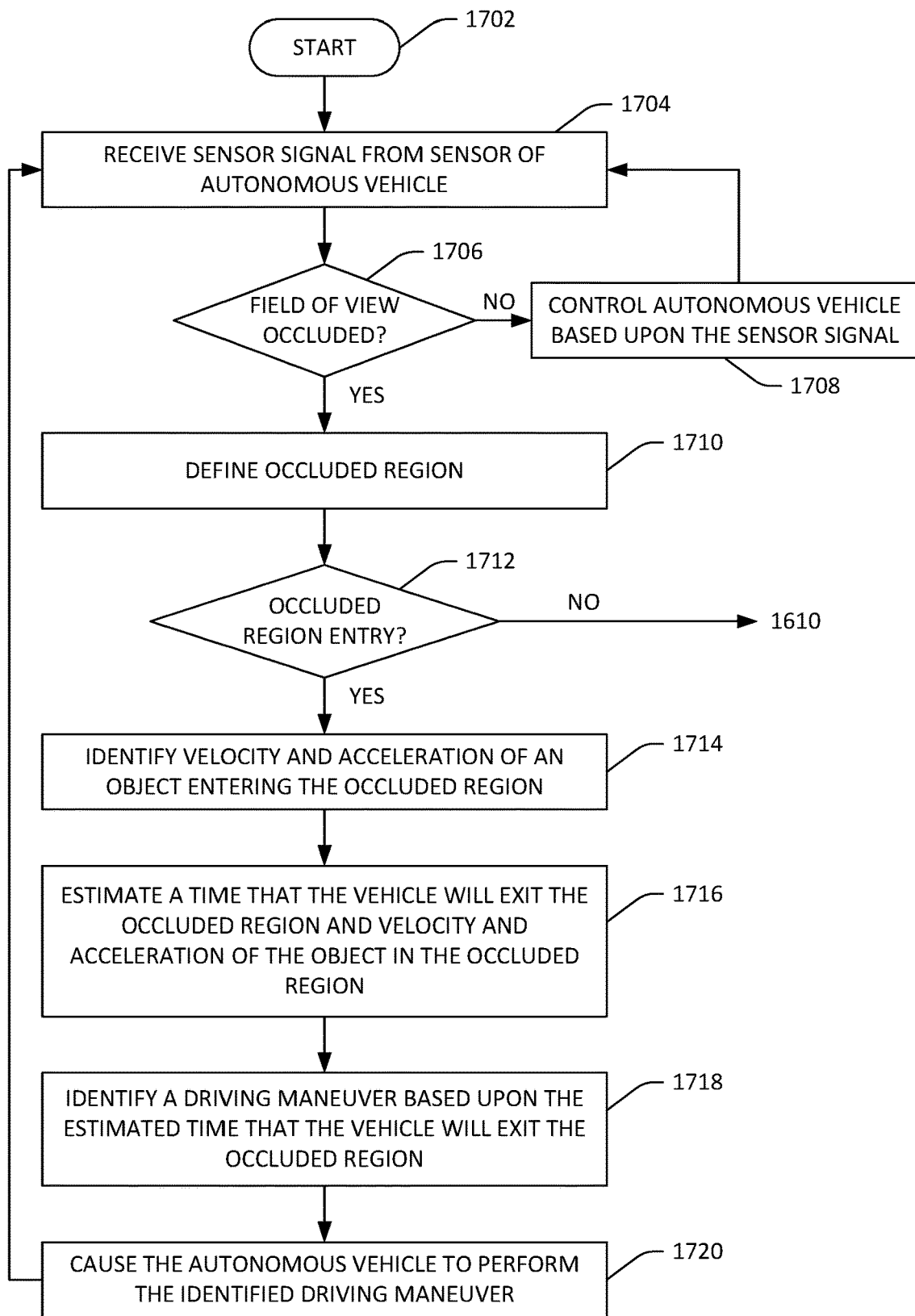
FIG. 17 is a flow diagram that illustrates an exemplary methodology performed by an AV when the AV identifies an object entering an occlusion band.

FIGS. 16 and 17 illustrate exemplary methodologies relating to assessing risk associated with an occluded region from the perspective of an AV and maneuvering based upon such assessment of risk. While the methodologies are shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. As used herein, the term "computer-readable medium" does not encompass a propagated signal.

Referring now to FIG. 16, an exemplary methodology 1600 for controlling operation of an AV is illustrated. The methodology 1600 starts at 1602, and at 1604 sensor data is received from a sensor of an AV. The sensor may be a lidar sensor, a radar sensor, a camera, or the like. At 1606, a determination is made as to whether there is an occluded region from the perspective of the AV. As indicated previously, the determination made at 1606 can be based upon a three-dimensional model of a geographic region that is generated based upon sensor signals output by sensors of the AV and a map of the region. If there is no portion of the model that lacks data, then at 1608 the AV is controlled based upon a sensor signal output by the sensor. The methodology 1600 then returns to 1604.

If at 1606 it is determined that an occluded region exists from the perspective of the AV, then at 1610 an occlusion band is identified. As noted previously, a roadway can be partitioned in the map into several bands of predefined lengths (e.g., 5 meters, 3 meters, 1 meter, etc.). An occlusion band can be a band that is at least partially included in the occluded region. Thus, each pixel in the sensor signal can be assigned a label that indicates whether or not the pixel belongs to an occlusion band, and further a pixel can be labeled to identify a particular occlusion band. An occluded region can include multiple occlusion bands, and occlusion bands can be tracked over time. A collection of adjacent occlusion bands forms an occluded region, although an occluded region may include a single occlusion band.

At 1612, a location of a hypothetical vehicle in the occluded region is computed, and further a velocity of the hypothetical vehicle is assigned to such vehicle. In an exemplary embodiment, the hypothetical vehicle can be assigned to a position that is closest to the AV while remaining in the occluded region. In another example, the hypothetical vehicle can be assigned to a location in the occluded region where the hypothetical vehicle is estimated to first be able to observe the AV.

At 1614 a reaction time of the hypothetical vehicle is estimated, wherein the reaction time is the amount of time between when the hypothetical vehicle is first able to observe the AV and when an action is expected to be performed by the vehicle in response to the vehicle observing the AV.

At 1616, a reaction of the hypothetical vehicle to the AV is estimated based upon the location assigned to the hypothetical vehicle in the occluded region, the velocity assigned to the hypothetical vehicle in the occluded region, the estimated reaction time of the AV, and a deceleration assigned to the hypothetical vehicle. For instance, the estimated reaction can be or include computation of the interaction point (described above). In another example, the estimated reaction may be a time when the hypothetical vehicle is expected to reach a predefined location (e.g., an edge of an intersection).

At 1618, a driving maneuver is identified based upon the estimated reaction of the hypothetical vehicle. The driving maneuver may be an acceleration, deceleration, a swerve, completion of a turn across a lane of traffic, pulling out from behind a double-parked vehicle, etc. At 1620, the AV is caused to perform the identified driving maneuver, and the methodology returns to 1604.

Now referring to FIG. 17, an exemplary methodology 1700 for controlling operation of an AV is illustrated. The methodology 1700 starts at 1702, and 1704 a sensor signal is received from a sensor of the AV. At 1706, a determination is made as to whether a portion of a field of view of the sensor is occluded. If it is determined at 1706 the field of view of the sensor is not occluded, then the methodology 1700 proceeds to 1708, where the AV is controlled based upon the sensor signal. The methodology 1700 then returns to 1704. If at 1706 it is determined that a portion of the field of view of the sensor is occluded, then at 1710 an occluded region is defined. The methodology 1700 subsequently proceeds to 1712, where a determination is made as to whether an object (e.g., a vehicle, a pedestrian, a bicyclist, etc.) has entered the occluded region. If is determined that no vehicle was entered the occluded band region the occluded band is being observed by the AV, then the methodology 1700 can proceed to step 1610 of the methodology 1700.

If it is determined at 1712 that an object has entered the occluded region, then at 1714 a velocity and acceleration of the object as it entered the occluded region is identified. This provides the control system 124 with additional information as to when the object is expected to exit the occluded region (as width of the occluded region is known and road geometry is known). At 1716, a time when the object is expected to exit the occluded region is estimated based upon the velocity and acceleration of the object has the object entered the occluded region, an amount of time since the object entered the occluded region, and optionally other factors such as speed limits, road geometry, etc. Additionally, velocity and/or acceleration of the object in the occluded region can be estimated.

At 1718 a driving maneuver to be undertaken by the AV is identified based upon the estimated time when the object is expected to exit the occluded region, the estimated velocity of the object in the occluded region, and/or the estimated acceleration of the object in the occluded region. For example, if it is determined that the object will not exit the occluded region for some relatively long period of time, then it can be identified that the AV has time to complete an unprotected left turn. At 1720, the AV is caused to perform the driving maneuver identified at 1718, and the methodology 1700 returns to 1704.

Figure 18:
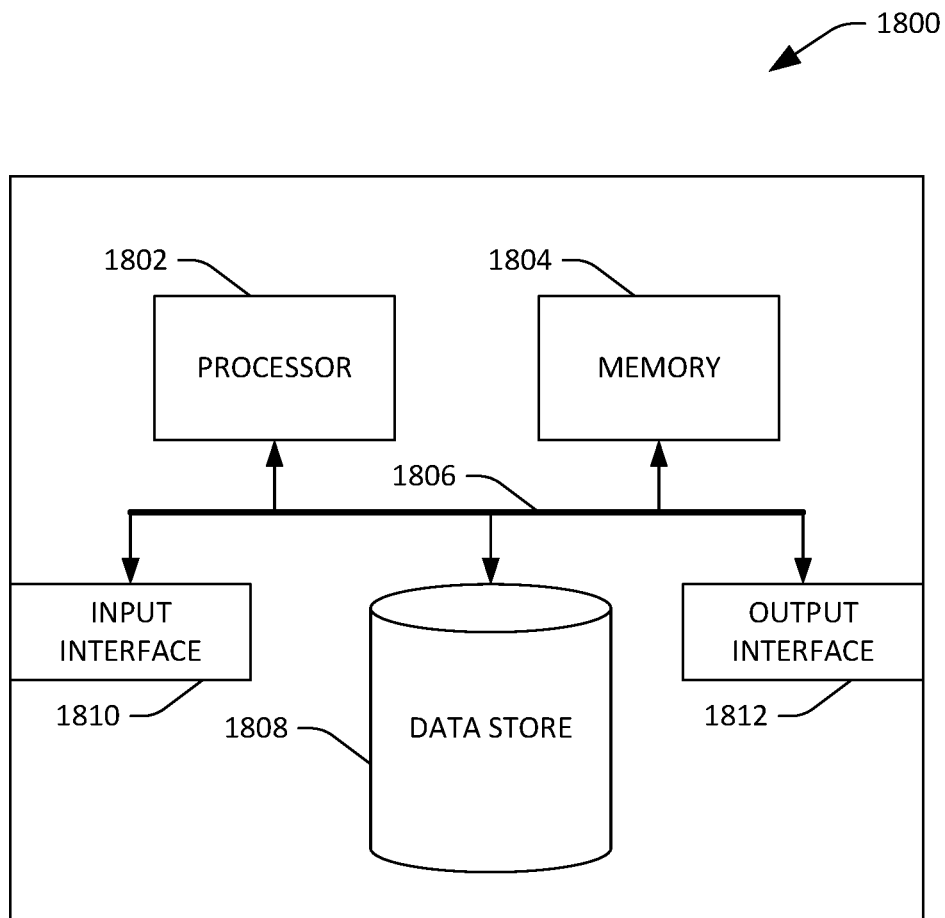
FIG. 18 is an exemplary computing system.

Referring now to FIG. 18, a high-level illustration of an exemplary computing device 1800 that can be used in accordance with the systems and methodologies disclosed herein is illustrated. For instance, the computing device 1800 may be or include the computing system 118. The computing device 1800 includes at least one processor 1802 that executes instructions that are stored in a memory 1804. The instructions may be, for instance, instructions for implementing functionality described as being carried out by one or more modules and systems discussed above or instructions for implementing one or more of the methods described above. The processor 1802 may be a GPU, a plurality of GPUs, a multi-core processor, etc. The processor 1802 may access the memory 1804 by way of a system bus 1806. In addition to storing executable instructions, the memory 1804 may also store a vehicle profile, an AV profile, a map, computed interaction points, boundaries of an occluded region, etc.

The computing device 1800 additionally includes a data store 1808 that is accessible by the processor 1802 by way of the system bus 1806. The data store 1808 may include executable instructions, sensor data, a vehicle profile, an AV profile, a map, etc. The computing device 1800 also includes an input interface 1810 that allows external devices to communicate with the computing device 1800. For instance, the input interface 1810 may be used to receive instructions from an external computer device, etc. The computing device 1800 also includes an output interface 1812 that interfaces the computing device 1800 with one or more external devices. For example, the computing device 1800 may transmit control signals to the mechanical system 116 by way of the output interface 1812.

Additionally, while illustrated as a single system, it is to be understood that the computing device 1800 may be a distributed system. Thus, for instance, several devices may be in communication by way of a network connection and may collectively perform tasks described as being performed by the computing device 1800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle (AV) comprising:
a computing system;
a mechanical system that is operably coupled to the computing system; and
a sensor that is configured to output a sensor signal, wherein the computing system is configured to receive the sensor signal, and further wherein the computing system is programmed to perform acts comprising:
detecting, based upon the sensor signal, that an object is impeding progress of the AV in a lane of a roadway being travelled over by the AV, wherein the AV is travelling in a first direction in the lane of the roadway;
identifying a path around the object, wherein the path around the object is over a portion of a second lane of the roadway, and further wherein traffic flows in a second direction that is opposite the first direction in the second lane of the roadway;
identifying an occluded region, wherein the occluded region is a spatial region where the AV lacks visibility, wherein the occluded region includes the portion of the second lane of the roadway;
hypothesizing that a vehicle is travelling in the occluded region in the second lane of the roadway towards the AV;
inferring that a driver of the vehicle will cause the vehicle to decelerate upon the AV becoming visible to the driver of the vehicle, wherein
inferring that the driver of the vehicle will cause the vehicle to decelerate upon the AV becoming visible to the driver of the vehicle comprises computing an interaction point where the vehicle is expected to come to a stop after decelerating due to the AV becoming visible to the driver of the vehicle; and
based upon the interaction point, controlling the mechanical system of the AV to cause the AV to navigate into the second lane of the roadway despite the AV lacking visibility in the occluded region.

2. The AV of claim 1, wherein the object is a vehicle that is stopped in the lane of the roadway.

3. The AV of claim 1, wherein the vehicle is a double-parked vehicle.

4. The AV of claim 1, wherein inferring that the driver of the vehicle will cause the vehicle to decelerate upon the AV becoming visible to the driver of the vehicle comprises:
computing a position in the occluded region where the AV is estimated to become visible to the driver of the vehicle, wherein the mechanical system is controlled to cause the AV to navigate into the second lane of the roadway based upon the computed position in the occluded region where the AV is estimated to be visible to the driver of the vehicle.

5. The AV of claim 4, wherein inferring that the driver of the vehicle will cause the vehicle to decelerate upon the AV becoming visible to the driver of the vehicle further comprises:
assigning a velocity to the vehicle when the vehicle is at the computed position, wherein the velocity is assigned based upon at least one of a speed limit of the roadway or geometry of the roadway, and further wherein the mechanical system is controlled to cause the AV to navigate into the second lane of the roadway based upon the velocity assigned to the vehicle when the vehicle is at the computed position.

6. The AV of claim 5, wherein inferring that the driver of the vehicle will cause the vehicle to decelerate upon the AV becoming visible to the driver of the vehicle further comprises:
assigning a reaction time to the driver of the vehicle, wherein the reaction time is an amount of time between when the AV is estimated to be visible to the driver of the vehicle and when the driver of the vehicle is expected to react to the AV, and further wherein the mechanical system is controlled to cause the AV to navigate into the second lane of the roadway based upon the reaction time assigned to the driver of the vehicle.

7. The AV of claim 6, wherein inferring that the driver of the vehicle will cause the vehicle to decelerate upon the AV becoming visible to the driver of the vehicle further comprises:
assigning a deceleration to the vehicle, wherein the driver of the vehicle is inferred to decelerate at the deceleration immediately subsequent to passage of the reaction time, and further wherein the mechanical system is controlled to cause the AV to navigate into the second lane of the roadway based upon the deceleration assigned to the vehicle.

8. The AV of claim 7, wherein the interaction point is in the second lane of the roadway, and further wherein the interaction point in the second lane is computed based upon:
the position in the occluded region where the AV is estimated to become visible to the driver of the vehicle;
the velocity assigned to the vehicle; and
the reaction time assigned to the the driver of the vehicle.

9. The AV of claim 8, wherein the computing system computes the interaction point in the second lane where the vehicle is expected to come to a stop due to the AV becoming visible to the driver of the vehicle through use of the following algorithm:

$$s_{interact} = v_i \times (\tau + t_{visible}) + \frac{v_i^2}{(2 \times a_{decel})},$$

where $s_{interact}$ is the interaction point in the second lane where the vehicle is expected to come to a stop, $v_i$ is the velocity assigned to the vehicle, $\tau$ is the reaction time assigned to the driver of the vehicle, $a_{decel}$ is the deceleration assigned to the vehicle, and $t_{visible}$ is an amount of time between when the vehicle is at the position in the occluded region where the AV is estimated to become to the driver of the vehicle and when the AV will actually be observed by the driver of the vehicle.

10. The AV of claim 8, wherein controlling the mechanical system of the AV to cause the AV to navigate into the second lane of the roadway comprises identifying a velocity curve for the AV, wherein the AV, when operating in accordance with the velocity curve, is able to come to a stop prior to the interaction point in the second lane where the vehicle is expected to come to a stop due to the AV becoming visible to the driver of the vehicle.

11. A method performed by an autonomous vehicle (AV), the method comprising:
   detecting a double-parked vehicle (DPV) that is impeding progress of the AV as the AV travels in a first direction in a first lane of a roadway;
   identifying a route around the DPV, wherein the route around the DPV is over a portion of a second lane of the roadway, wherein traffic flows in the second lane of the roadway in a second direction that is opposite the first direction;
   identifying an occluded region, wherein the AV lacks visibility in the occluded region due to the DPV impeding sensor signals emitted by a sensor of the AV;
   determining that the portion of the second lane of the roadway is in the occluded region;
   hypothesizing that a vehicle is travelling in the occluded region in the second lane of the roadway towards the AV;
   inferring that a driver of the vehicle will cause the vehicle to decelerate upon the AV becoming visible to the driver of the vehicle, wherein inferring that the driver of the vehicle will cause the vehicle to decelerate comprises computing a position where the vehicle is expected to come to a stop after decelerating due to the AV becoming visible to the driver of the vehicle; and
   entering the second lane of the roadway despite the AV lacking visibility into the occluded region, wherein the AV enters the second lane of the roadway based upon the computed position.

12. The method of claim 11, wherein the AV enters the second lane of the roadway based upon a boundary of the occluded region relative to the AV.

13. The method of claim 12, further comprising:
   computing a reaction of the driver of the vehicle to the AV, wherein the AV is caused to enter the second lane of the roadway based upon the computed reaction of the driver of the vehicle to the AV.

14. The method of claim 13, wherein the position is computed based upon the following algorithm:

$$s_{interact} = v_i \times (\tau + t_{visible}) + \frac{v_i^2}{(2 \times a_{decel})},$$

where $s_{interact}$ is the position, $v_i$ is a velocity assigned to the vehicle, $\tau$ is a reaction time assigned to the driver of the vehicle, wherein the reaction time is an amount of time between when the AV is first observable to the driver of the vehicle and when the driver of the hypothetical vehicle reacts to the AV, $a_{decel}$ is a deceleration assigned to the vehicle, and $t_{visible}$ is an amount of time from when the AV is first observable to the driver of the vehicle and when the AV is actually observed by the driver of the vehicle.

15. The method of claim 11, further comprising assigning a reaction time to the driver of the vehicle, wherein the reaction time is an amount of time between when the AV is observable to the driver of the vehicle and when the driver of the vehicle begins to decelerate the vehicle, and further wherein the AV enters the second lane of the roadway based upon the reaction time assigned to the driver.

16. The method of claim 15, further comprising:
   assigning a deceleration to the vehicle; and
   computing the position where the vehicle is expected to come to a stop based upon the reaction time assigned to the driver of the vehicle and the deceleration assigned to the vehicle, wherein the AV enters the second lane of the roadway based upon the computed position.

17. The method of claim 16, further comprising:
   continuously updating the position based upon sensor signals generated by the AV as the AV enters the second lane of the roadway.

18. An autonomous vehicle (AV) comprising a non-transitory computer-readable storage medium, the computer-readable storage medium has instructions stored therein that, when executed by a processor of the AV, cause the processor of the AV to perform acts comprising:
   identifying an occluded region, wherein the occluded region is a spatial region within which the AV lacks visibility;
   detecting that an object is impeding movement of the AV in a first lane of a roadway being traveled in by the AV, wherein the AV is travelling in a first direction in the first lane;
   identifying that a path around the object is over a portion of a second lane of the roadway, wherein traffic in the second lane of the roadway flows in a second direction that is opposite the first direction;
   detecting that the portion of the roadway is included in the occluded region;
   hypothesizing that a vehicle is travelling in the occluded region in the second lane of the roadway towards the AV;
   inferring that a driver of the vehicle will cause the vehicle to decelerate upon the AV becoming visible to the driver of the vehicle, wherein inferring that the driver of the vehicle will cause the vehicle to decelerate comprises computing a position in the second lane of the roadway where the vehicle will come to a stop after decelerating due to the AV becoming visible to the driver of the vehicle; and
   responsive to computing the position and based upon the position, causing the AV to enter the second lane of the roadway and travel in the first direction in the second lane of the roadway.

19. The non-transitory computer-readable storage medium of claim 18, the acts further comprising:
   subsequent to causing the AV to enter the second lane of the roadway, detecting a travelling vehicle in the second lane of the roadway based upon a signal output by a sensor of the AV; and
   causing the AV to decelerate responsive to detecting the travelling vehicle in the second lane of the roadway.

* * * * *